(12) United States Patent
Kotzur et al.

(10) Patent No.: US 11,287,988 B2
(45) Date of Patent: Mar. 29, 2022

(54) AUTONOMOUS RAID DATA STORAGE DEVICE LOCKING SYSTEM

(71) Applicant: Dell Products L.P., Round Rock, TX (US)

(72) Inventors: Gary Benedict Kotzur, Austin, TX (US); William Emmett Lynn, Round Rock, TX (US); Kevin Thomas Marks, Georgetown, TX (US); Chandrashekar Nelogal, Round Rock, TX (US); James Peter Giannoules, Round Rock, TX (US); Austin Patrick Bolen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 111 days.

(21) Appl. No.: 16/839,799

(22) Filed: Apr. 3, 2020

(65) Prior Publication Data

US 2021/0311639 A1    Oct. 7, 2021

(51) Int. Cl.
*G06F 3/06* (2006.01)
*G06F 11/10* (2006.01)

(52) U.S. Cl.
CPC .......... *G06F 3/0619* (2013.01); *G06F 3/0644* (2013.01); *G06F 3/0659* (2013.01); *G06F 3/0689* (2013.01); *G06F 11/1096* (2013.01)

(58) Field of Classification Search
None
See application file for complete search history.

(56) References Cited

U.S. PATENT DOCUMENTS

| 10,019,196 | B2 | 7/2018 | Zaltsman et al. | |
| 2006/0288161 | A1 | 12/2006 | Cavallo | |
| 2011/0208912 | A1* | 8/2011 | Chambliss | G06F 11/1076 711/114 |
| 2011/0208994 | A1* | 8/2011 | Chambliss | G06F 11/1092 714/6.24 |
| 2011/0208995 | A1* | 8/2011 | Hafner | G06F 11/1076 714/6.24 |
| 2011/0208996 | A1* | 8/2011 | Hafner | G06F 9/466 714/6.24 |
| 2017/0249223 | A1* | 8/2017 | Sherlock | G06F 11/2094 |
| 2019/0065314 | A1* | 2/2019 | Sherlock | G06F 3/0619 |
| 2021/0165579 | A1* | 6/2021 | Bernat | G06F 12/06 |

* cited by examiner

*Primary Examiner* — Guerrier Merant
(74) *Attorney, Agent, or Firm* — Joseph Mencher

(57) ABSTRACT

An autonomous RAID data storage device locking system includes first RAID data storage device(s) that store data included in a data stripe, and that are coupled to a second RAID data storage device. The second RAID data storage device receives a command to perform a data update operation on a subset of data included in the data stripe, and transmits a locking request to each first RAID data storage device. When the second RAID data storage device receives a locking confirmation that indicates that each first RAID data storage device is locked, it completes the data update operation on the subset of data included in the data stripe. The second RAID data storage device then transmits an unlocking request to each first RAID data storage device to cause them to unlock, and transmits a completion communication that indicates that the data update operation has been performed.

20 Claims, 23 Drawing Sheets

AUTONOMOUS RAID DATA STORAGE DEVICE LOCKING SYSTEM

BACKGROUND

The present disclosure relates generally to information handling systems, and more particularly to autonomously locking RAID data storage devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometime utilize storage systems such as those provided by a Redundant Array of Independent Disks (RAID) storage system that includes a plurality of RAID data storage devices. As will be appreciated by one of skill in the art, RAID data storage systems are provided by a data storage virtualization technology that combines the physical RAID data storage devices into one or more logical storage units for the purposes of data redundancy, performance improvements, and/or other benefits known in the art. For example, data in a RAID data storage system may be distributed across the RAID data storage devices using several different techniques that are referred to as "RAID levels" that provide different levels of redundancy and performance (e.g., RAID 0, RAID 1, RAID 5, RAID 6, and so on), with each RAID level providing a different balance among goals that include reliability, availability, performance, and capacity.

The introduction of new storage technologies for use in RAID data storage systems has provided for performance and efficiency improvements in RAID data storage systems. For example, Non-Volatile Memory express (NVMe) storage devices (e.g., NVMe Solid State Drive (SSD) drives) utilize an open logical device interface specification for accessing its non-volatile storage media (e.g., provided by NAND flash memory devices) via a Peripheral Component Interconnect express (PCIe) bus to provide low latency, internal parallelism, and/or other benefits known in the art, and have begun to be implemented as the RAID data storage devices discussed above in order to assist in data update operations for the RAID data storage system. The inventors of the present disclosure describe some techniques for performing RAID storage-device-assisted data updates in U.S. patent application Ser. No. 16/586,445, filed on Sep. 27, 2019, and those RAID data storage systems may utilize NVMe storage devices to perform some or all of the data update operations that are traditionally performed by a RAID storage controller device in the RAID data storage system. However, the RAID storage-device-assisted data updates discussed above still require orchestration of RAID data transfer operations by the RAID storage controller device, thus opening up opportunities to further offload operations from RAID storage controller devices.

Accordingly, it would be desirable to provide a RAID data storage system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Redundant Array of Independent Disks (RAID) data storage engine that is configured to: receive a command to perform a data update operation on a subset of data that is included in a data stripe; transmit a locking request to each at least one first RAID data storage device that stores data that is included in the data stripe; receive a locking confirmation that indicates that each first RAID data storage device is locked; complete, in response to receiving the locking confirmation, the data update operation on the subset of data that is included in the data stripe; transmit, in response to completing the data update operation, an unlocking request to each first RAID data storage device to cause each first RAID data storage device to unlock; and transmit a completion communication that indicates that the data update operation has been performed.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
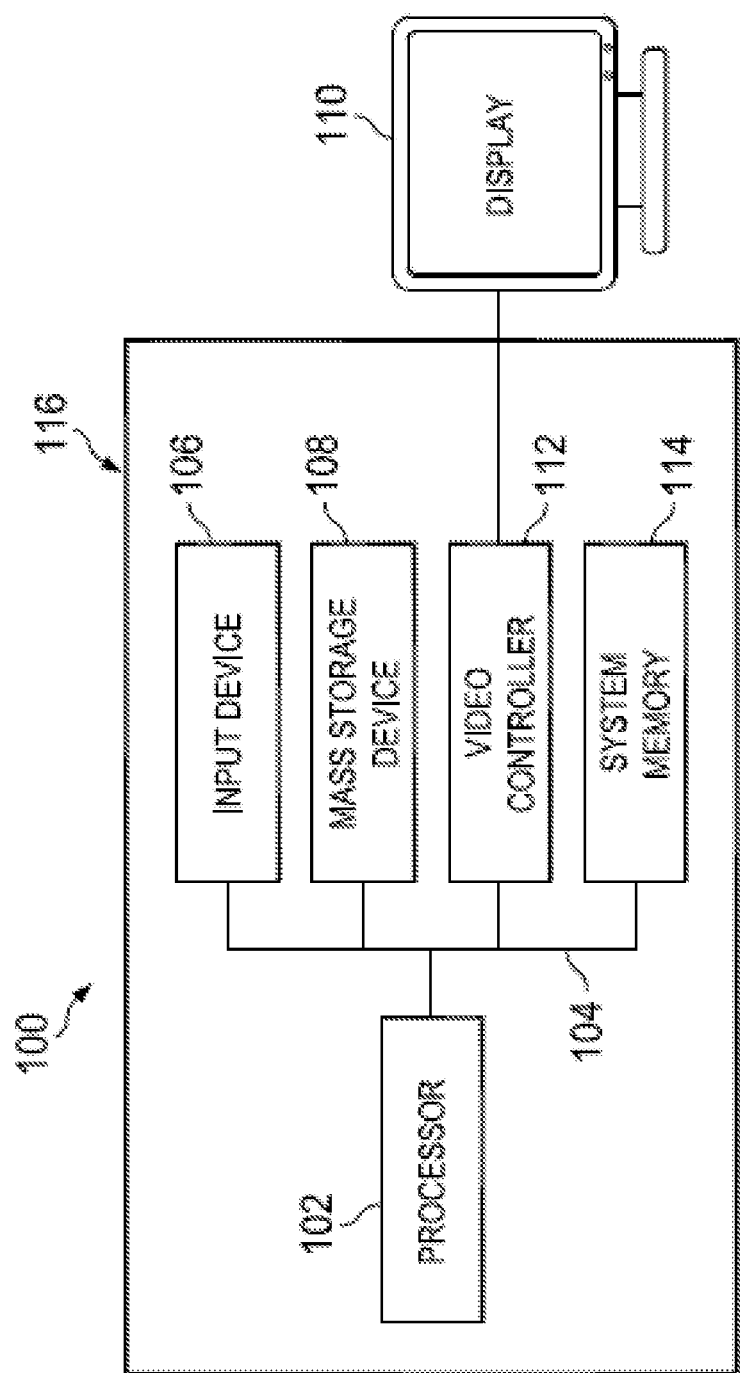
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
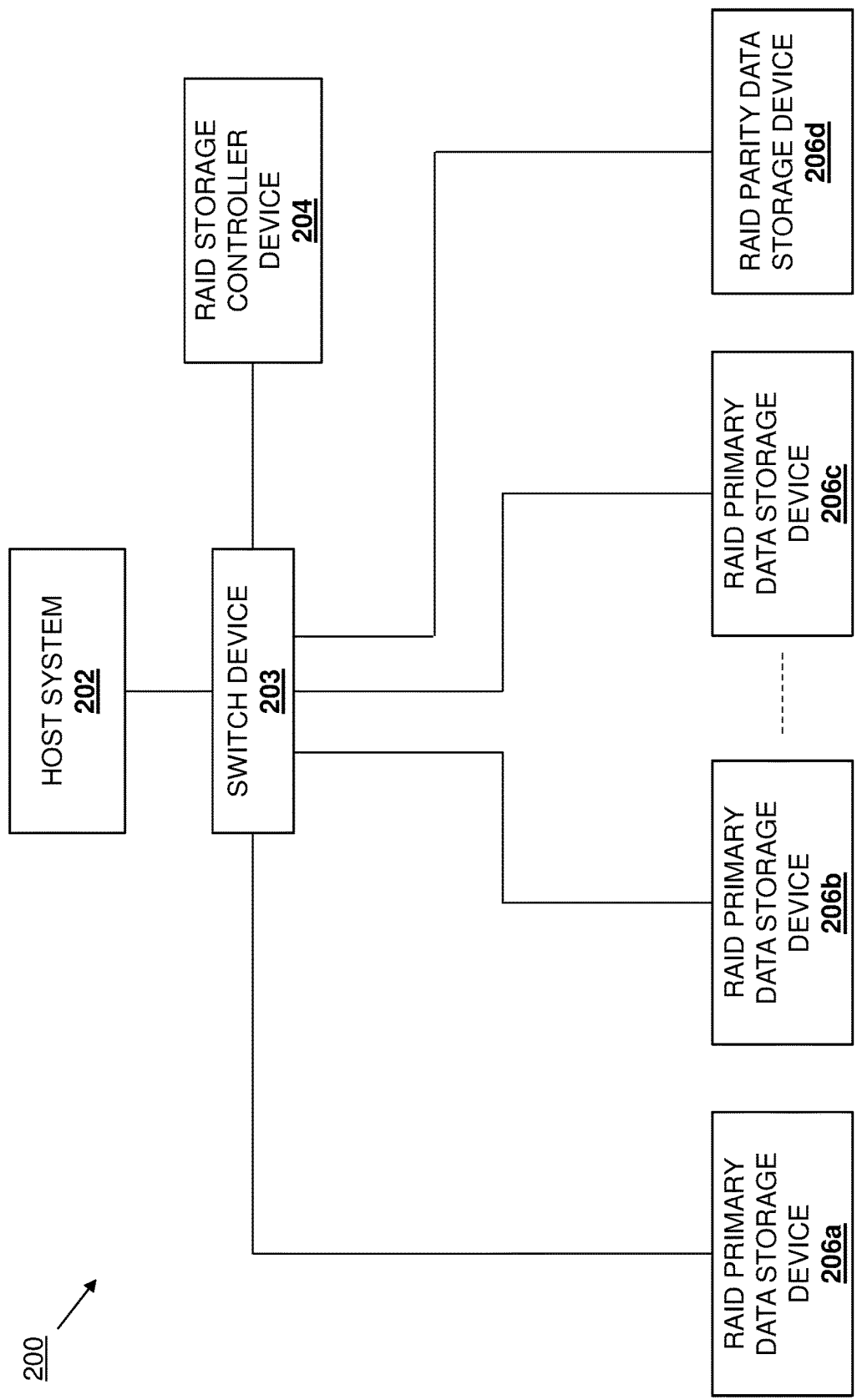
FIG. 2 is a schematic view illustrating an embodiment of a RAID data storage system.

Referring now to FIG. 2, an embodiment of a Redundant Array of Independent Disks (RAID) data storage system 200 is illustrated. In the illustrated embodiment, the RAID data storage system 200 incudes a host system 202. In an embodiment, the host system 202 may be provided by the IHS 100 discussed above with reference to FIG. 1, and/or may include some or all of the components of the IHS 100. For example, the host system 202 may include server device(s), desktop computing device(s), a laptop/notebook computing device(s), tablet computing device(s), mobile phone(s), and/or any other host devices that one of skill in the art in possession of the present disclosure would recognize as operating similarly to the host system 202 discussed below. In the illustrated embodiment, the RAID data storage system 200 also includes a switch device 203 that is coupled to the host system 202 and that may be provided by the IHS 100 discussed above with reference to FIG. 1, and/or may include some or all of the components of the IHS 100. For example, the switch device 203 may be provided by a Peripheral Component Interconnect Express (PCIe) switch device, although other switch devices will fall within the scope of the present disclosure as well.

In the illustrated embodiment, the RAID data storage system 200 also includes a RAID storage controller device 204 that is coupled to the host system 202 via the switch device 203, and that may be provided by the IHS 100 discussed above with reference to FIG. 1, and/or may include some or all of the components of the IHS 100. For example, the RAID storage controller device 204 may include any storage device/disk array controller device that is configured to manage physical storage devices and present them to host systems as logical units. In the discussion below, the RAID storage controller device 204 includes a processing system, and a memory system that is coupled to the processing system and that includes instructions that, when executed by the processing system, cause the processing system to provide a RAID storage controller engine that is configured to perform the functions of the RAID storage controller engines and RAID storage controller devices discussed below.

While a specific RAID storage controller device 204 has been illustrated in a particular configuration (e.g., a "look-aside" RAID storage controller device configuration where the RAID storage controller device 204 is coupled to each of the host system 202 and the RAID data storage devices 206a-206d, and with each of the RAID data storage device 206a-206d including a "direct" connection to the host system 202 via the switch device 203), one of skill in the art in possession of the present disclosure will recognize that RAID storage controller devices (or other devices operating according to the teachings of the present disclosure in a manner similar to that described below for the RAID storage controller device 204) may include a variety of components and/or component configurations for providing conventional RAID storage controller device functionality, as well as the functionality discussed below, while remaining within the scope of the present disclosure as well. For example, while one of skill in the art in possession of the present disclosure will recognize that the RAID storage controller device 204 is illustrated and described as a hardware RAID storage controller device provided in a chassis, in other embodiments the RAID storage controller device may be a software RAID storage controller device provided by software (e.g., instructions stored on a memory system) in the host system 202 that is executed by a processing system in the host system 202 while remaining within the scope of the present disclosure as well. As such, in some embodiments, the operations of the RAID storage controller device 204 discussed below may be performed via the processing system in the host system 202.

Furthermore, the RAID data storage system 200 also includes a plurality of RAID data storage devices that are illustrated in FIG. 2 as a plurality of RAID primary data storage devices 206a, 206b, and up to 206c, along with a RAID parity storage data device 206d, each of which is coupled to the host system 202 and the RAID storage controller system 204 via the switch device 203. However, as will be appreciated by one of skill in the art in possession of the present disclosure, any or all the plurality of RAID data storage devices in the RAID data storage system 200 illustrated in FIG. 2 may perform dual roles for different data stripes, with any particular RAID data storage device operating as a RAID primary data storage device for one data stripe and a RAID parity data storage device for another data stripe. As will be appreciated by one of skill in the art in possession of the present disclosure, the RAID data storage devices in the RAID data storage system 200 of FIG. 2 are described as operating in a RAID 5 configuration, with the RAID primary data storage devices configured to store primary data (e.g., provided by the host system 202), and the RAID parity data storage device configured to store parity data that may be utilized to recover primary data when that primary data becomes unavailable on one of the RAID primary data storage devices.

However, while a few RAID data storage devices in a particular configuration are illustrated, one of skill in the art in possession of the present disclosure will recognize that many more storage devices may (and typically will) be coupled to the RAID storage controller system 204 (e.g., in a datacenter) and may be provided in other RAID configurations while remaining within the scope of the present disclosure. In the embodiments discussed below, the RAID data storage devices 206a-206d are described as being provided by Non-Volatile Memory express (NVMe) Solid State Drive (SSD) drives, but one of skill in the art in possession of the present disclosure will recognize that other types of storage devices with similar functionality as the NVMe SSD drives (e.g., NVMe PCIe add-in cards, NVMe M.2 cards, etc.) may be implemented according to the teachings of the present disclosure and thus will fall within its scope as well. Furthermore, while a specific RAID data storage system 200 has been illustrated and described, one of skill in the art in possession of the present disclosure will recognize that the RAID data storage system of the present disclosure may include a variety of components and component configurations while remaining within the scope of the present disclosure as well.

Figure 3:
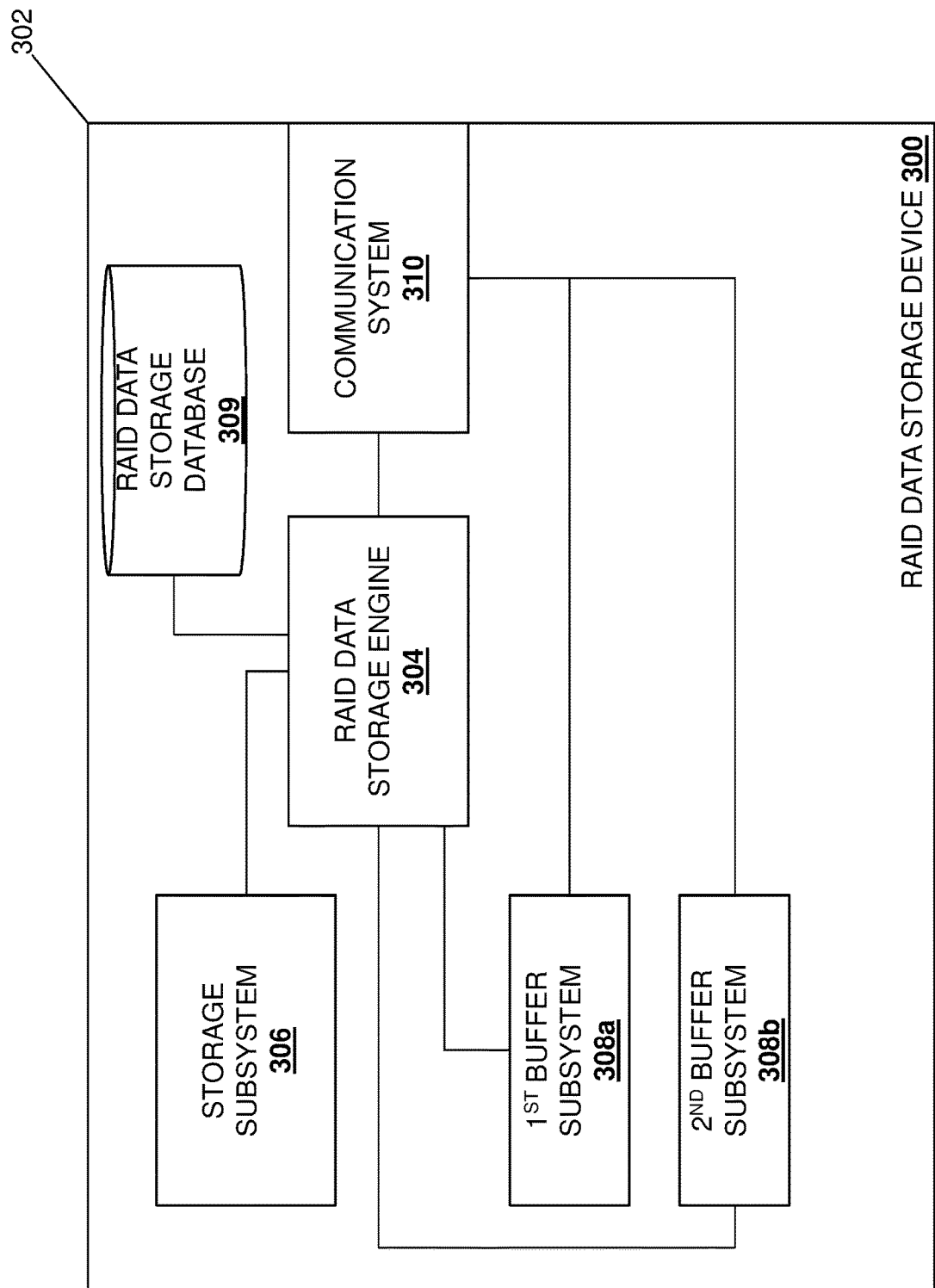
FIG. 3 is a schematic view illustrating an embodiment of a RAID data storage device that may be provided in the RAID data storage system of FIG. 2.

Referring now to FIG. 3, an embodiment of a RAID data storage device 300 is illustrated that may provide any or all of the RAID primary data storage devices and the RAID parity data storage device discussed above with reference to FIG. 2. As such, the RAID data storage device 300 may be provided by an NVMe SSD storage device, but one of skill in the art in possession of the present disclosure will recognize that other types of storage devices with similar functionality as the NVMe SSD storage devices (e.g., NVMe PCIe add-in cards, NVMe M.2 cards, etc.) may be provided according to the teachings of the present disclosure and thus will fall within its scope as well. In the illustrated embodiment, the RAID data storage device 300 includes a chassis 302 that houses the components of the RAID data storage device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID storage engine 304 that is configured to perform the functionality of the RAID storage engines and/or RAID data storage devices discussed below. While not illustrated, one of skill in the art in possession of the present disclosure will recognize that the RAID storage engine 304 may include, or be coupled to, other components such as a queues (e.g., submission queues and completion queues) and/or RAID data storage device components that would be apparent to one of skill in the art in possession of the present disclosure.

The chassis 302 may also house a storage subsystem 306 that is coupled to the RAID storage engine 304 (e.g., via a coupling between the storage subsystem 306 and the processing system). Continuing with the example provided above in which the RAID data storage device 300 is an NVMe SSD storage device, the storage subsystem 306 may be provided by a flash memory array such as, for example, a plurality of NAND flash memory devices. However, one of skill in the art in possession of the present disclosure will recognize that the storage subsystem 306 may be provided using other storage technologies while remaining within the scope of the present disclosure as well. The chassis 302 may also house a first buffer subsystem 308a that is coupled to the RAID storage engine 304 (e.g., via a coupling between the first buffer subsystem 308a and the processing system). Continuing with the example provided above in which the RAID data storage device 300 is an NVMe SSD storage device, the first buffer subsystem 308a may be provided by device buffer that is internal to the NVMe SSD storage device, not accessible via a PCIe bus connected to the NVMe SSD storage device, and conventionally utilized to initially store data received via write commands before writing them to flash media (e.g., NAND flash memory devices) in the NVMe SSD storage device. However, one of skill in the art in possession of the present disclosure will recognize that the first buffer subsystem 308a may be provided using other buffer technologies while remaining within the scope of the present disclosure as well.

The chassis 302 may also house a second buffer subsystem 308b that is coupled to the RAID storage engine 304 (e.g., via a coupling between the second buffer subsystem 308b and the processing system). Continuing with the example provided above in which the RAID data storage device 300 is an NVMe SSD storage device, the second buffer subsystem 308b may be provided by a Controller Memory Buffer (CMB) subsystem. However, one of skill in the art in possession of the present disclosure will recognize that the second buffer subsystem 308b may be provided using other buffer technologies while remaining within the scope of the present disclosure as well. The chassis 302 may also house a storage system (not illustrated, but which may be provided by the storage device 108 discussed above with reference to FIG. 1) that is coupled to the RAID storage engine 304 (e.g., via a coupling between the storage system and the processing system) and that includes a RAID storage database 309 that is configured to store any of the information utilized by the RAID storage engine 304 as discussed below.

The chassis 302 may also house a communication system 310 that is coupled to the RAID storage engine 304 (e.g., via a coupling between the communication system 310 and the processing system), the first buffer subsystem 308a, and the second buffer subsystem 308b, and that may be provided by any of a variety of storage device communication technologies and/or any other communication components that would be apparent to one of skill in the art in possession of the present disclosure. Continuing with the example provided above in which the RAID data storage device 300 is an NVMe SSD storage device, the communication system 310 may include any NVMe SSD storage device communication component that enables the Direct Memory Access (DMA) operations described below, the submission and completion queues discussed below, as well as any other components that provide NVMe SDD storage device communication functionality that would be apparent to one of skill in the art in possession of the present disclosure. While a specific RAID data storage device 300 has been illustrated, one of skill in the art in possession of the present disclosure will recognize that RAID data storage devices (or other devices operating according to the teachings of the present disclosure in a manner similar to that described below for the RAID data storage device 300) may include a variety of components and/or component configurations for providing conventional RAID data storage device functionality, as well as the functionality discussed below, while remaining within the scope of the present disclosure as well.

Figure 4:
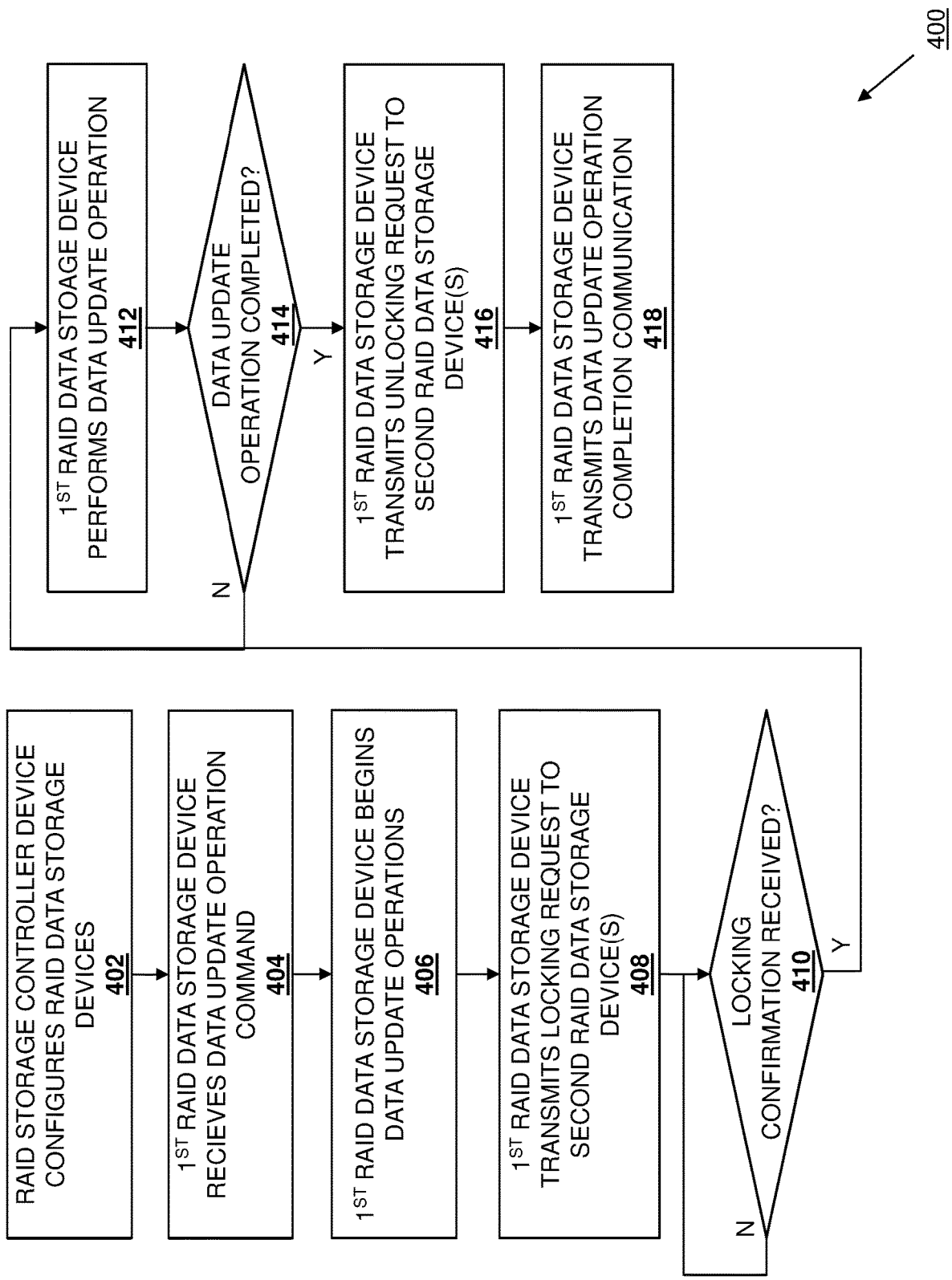
FIG. 4 is a flow chart illustrating an embodiment of a method for autonomously locking RAID data storage devices.

Referring now to FIG. 4, an embodiment of a method 400 for autonomously locking RAID data storage devices is illustrated. As discussed below, the systems and methods of the present disclosure provide for autonomous locking operations by RAID data storage devices in a RAID data storage system in order to allow a stripe of data stored on those RAID data storage devices to be updated. For example, first RAID data storage devices may store data that is included in a data stripe, and a second RAID data storage device coupled to the first RAID data storage device may receive a command to perform a data update operation on a subset of data that is included in the data stripe. In response, the second RAID data storage device may transmit a locking request to each first RAID data storage device and receive a locking confirmation that indicates that each first RAID data storage device is locked. In response, the second RAID data storage device may complete data update operation on the subset of data that is included in the data stripe, and then transmit an unlocking request to each first RAID data storage device to cause each first RAID data storage device to unlock. The second RAID data storage device may then transmit a completion communication that indicates that the data update operation has been performed. As such, orchestration of RAID storage-device-assisted data updates by RAID storage controller devices is substantially reduced by allowing RAID data storage devices to autonomously lock and unlock during their performance of a data update command.

Figure 5:
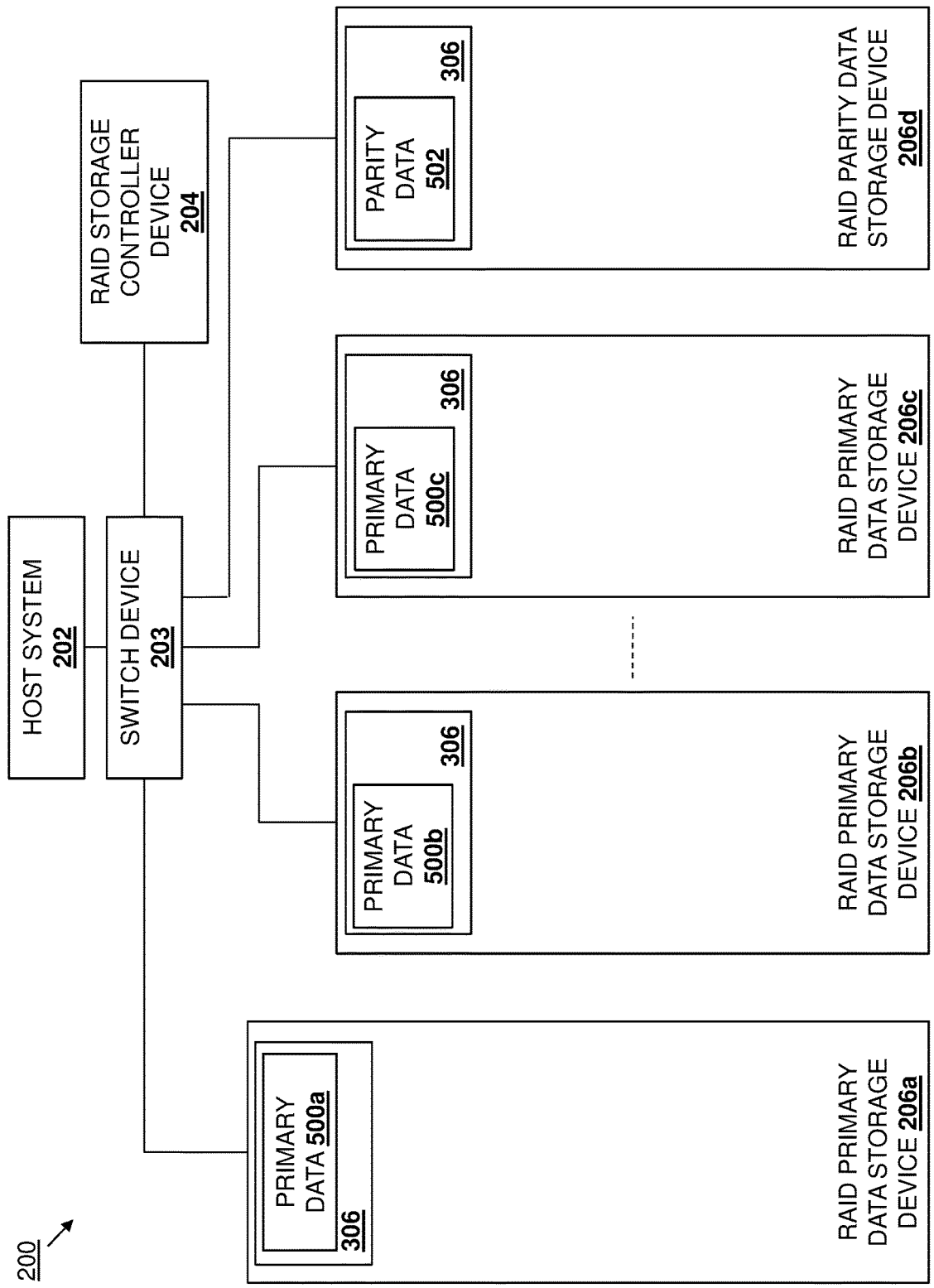
FIG. 5 is a schematic view illustrating an embodiment of the RAID data storage system of FIG. 2 operating during the method of FIG. 4.

With reference to FIG. 5, the RAID storage system 200 is illustrated with the RAID primary data storage device 206a storing primary data 500a in its storage subsystem 306, the RAID primary data storage device 206b storing primary data 500b in its storage subsystem 306, and the RAID primary data storage device 206c storing primary data 500c in its storage subsystem 306. While only three RAID primary data storage devices are illustrated and described in the examples provided below, one of skill in the art in possession of the present disclosure will recognize that any number of RAID primary data storage devices may store primary data while remaining within the scope of the present disclosure as well. In addition, the RAID storage system 200 is also illustrated with the RAID parity data storage device 206d storing parity data 502 in its storage subsystem 306, and one of skill in the art in possession of the present disclosure will recognize that the parity data 502 may have been generated via an XOR operation performed on the primary data 500a-500c in the RAID primary data storage devices 206a-206c, and allows for the rebuilding of any primary data stored on any one RAID primary data storage device in the event that primary data/RAID primary data storage device becomes unavailable.

As will also be appreciated by one of skill in the art in possession of the present disclosure, and as discussed in some of the examples provided below, the primary/parity data storage configuration illustrated in FIG. 5 provides primary/parity for a single data strip, and different data strips may have different primary/parity data storage configurations (e.g., in a plurality of RAID storage devices provided in a RAID storage system, a first data stripe may include primary data on first, second, and third RAID storage devices and parity data on a fourth RAID storage device; a second data stripe may include primary data on the second, third, and fourth RAID storage devices and parity data on the first RAID storage device, etc.) As such, while a particular RAID storage system device and data configuration is illustrated for purposes of the examples below, one of skill in the art in possession of the present disclosure will recognize that a variety of device and data configurations will fall within the scope of the present disclosure as well.

The method 400 begins at block 402 where a RAID storage controller device configures RAID data storage devices. In an embodiment, at block 402, the RAID storage controller engine in the RAID storage controller device 204 may operate to communicate with the RAID data storage devices 206a-206d in order to configure the RAID data storage devices 206a-206d to perform the direct command operations with each other as discussed in further detail below, as well as to perform the multicasting communications discussed in further detail below. The inventors of the present disclosure have developed techniques for providing direct command operation between RAID data storage devices which are described in U.S. patent application Ser. No. 16/838,224, filed on Apr. 2, 2020, the disclosure of which is incorporated herein by reference in its entirety. As discussed in that application, for each pair of RAID data storage devices 206a-206d in the RAID data storage system 200, the RAID storage controller device 204 may communicate with those RAID data storage devices 206a-206d to configure submission and completion queue pairs that allow any RAID data storage device in the RAID data storage system 200 to provide commands directly to another RAID data storage device in the RAID data storage system 200 using virtual functions (Single Root Input/Output Virtualization (SR-IOV) virtual functions) in those RAID data storage devices 206a-206d, as well as to directly indicate to another RAID data storage device in the RAID data storage system 200 that a command received from that RAID data storage device has been completed (which may include the transmission of an interrupt directly between those RAID data storage devices.) In addition, the configuration at block 402 may include configuring RAID primary data storage devices that store primary data for a data stripe in the RAID data storage system 200 as part of multi-casting groups (e.g., a PCIe multi-casting groups) in order to enable the exchange of the multi-cast locking and unlocking communications discussed below.

Figure 6A:
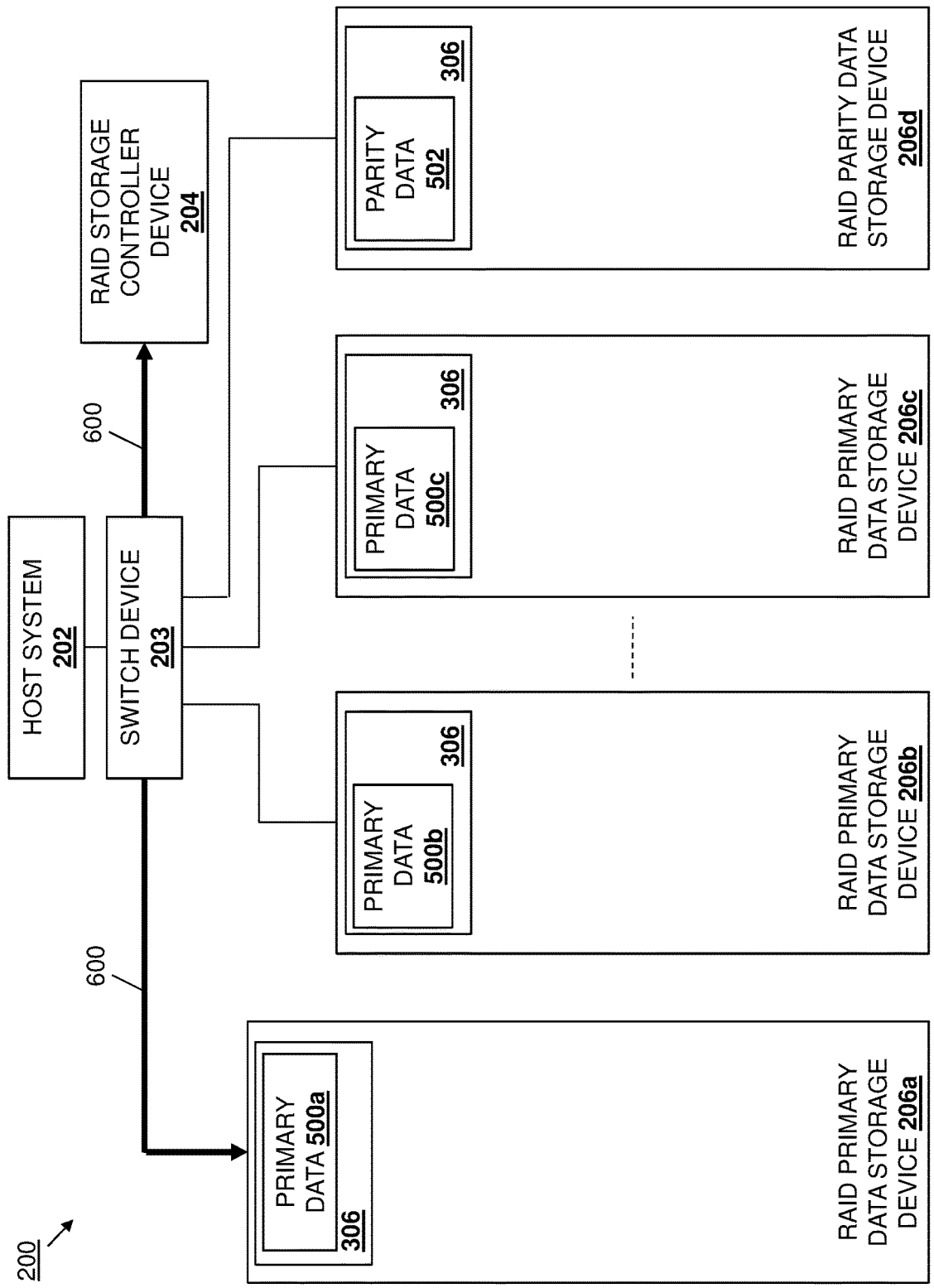
FIG. 6A is a schematic view illustrating an embodiment of the RAID data storage system of FIG. 2 operating during the method of FIG. 4.
Figure 6B:
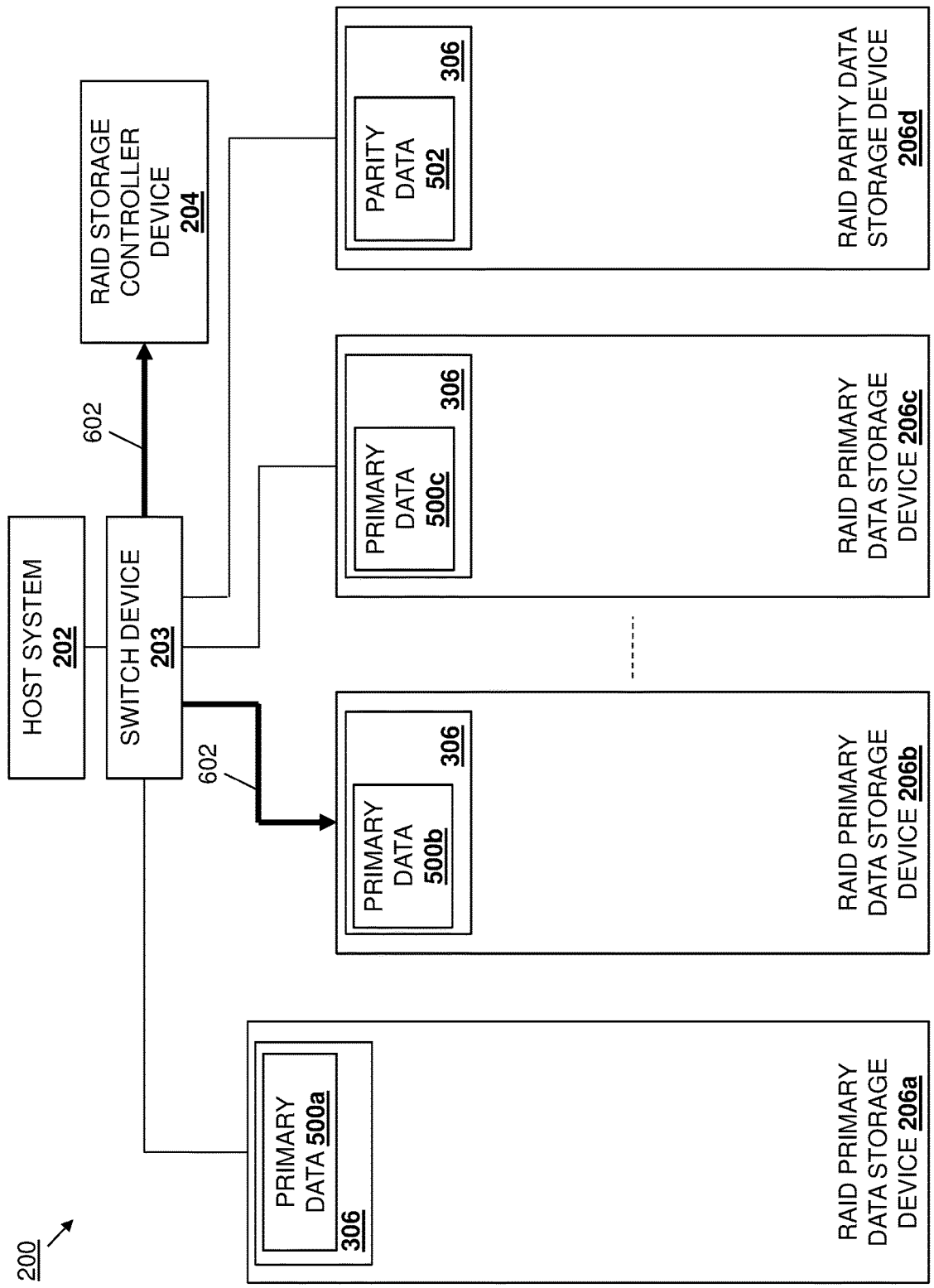
FIG. 6B is a schematic view illustrating an embodiment of the RAID data storage system of FIG. 2 operating during the method of FIG. 4.

As such, with reference to FIG. 6A, the RAID storage controller engine in the RAID storage controller device 204 may perform configuration communications 600 with the RAID primary data storage device 206a in order to configure at least some of the submission and completions queues utilized by the RAID primary data storage device 206a/RAID primary data storage device 206b pair, the RAID primary data storage device 206a/RAID primary data storage device 206c pair, and the RAID primary data storage device 206a/RAID parity data storage device 206d pair. Similarly, with reference to FIG. 6B, the RAID storage controller engine in the RAID storage controller device 204 may perform configuration communications 602 with the RAID primary data storage device 206b in order to configure at least some of the submission and completions queues utilized by the RAID primary data storage device 206b/RAID primary data storage device 206a pair, the RAID primary data storage device 206b/RAID primary data storage device 206c pair, and the RAID primary data storage device 206b/RAID parity data storage device 206d pair.

Figure 6C:
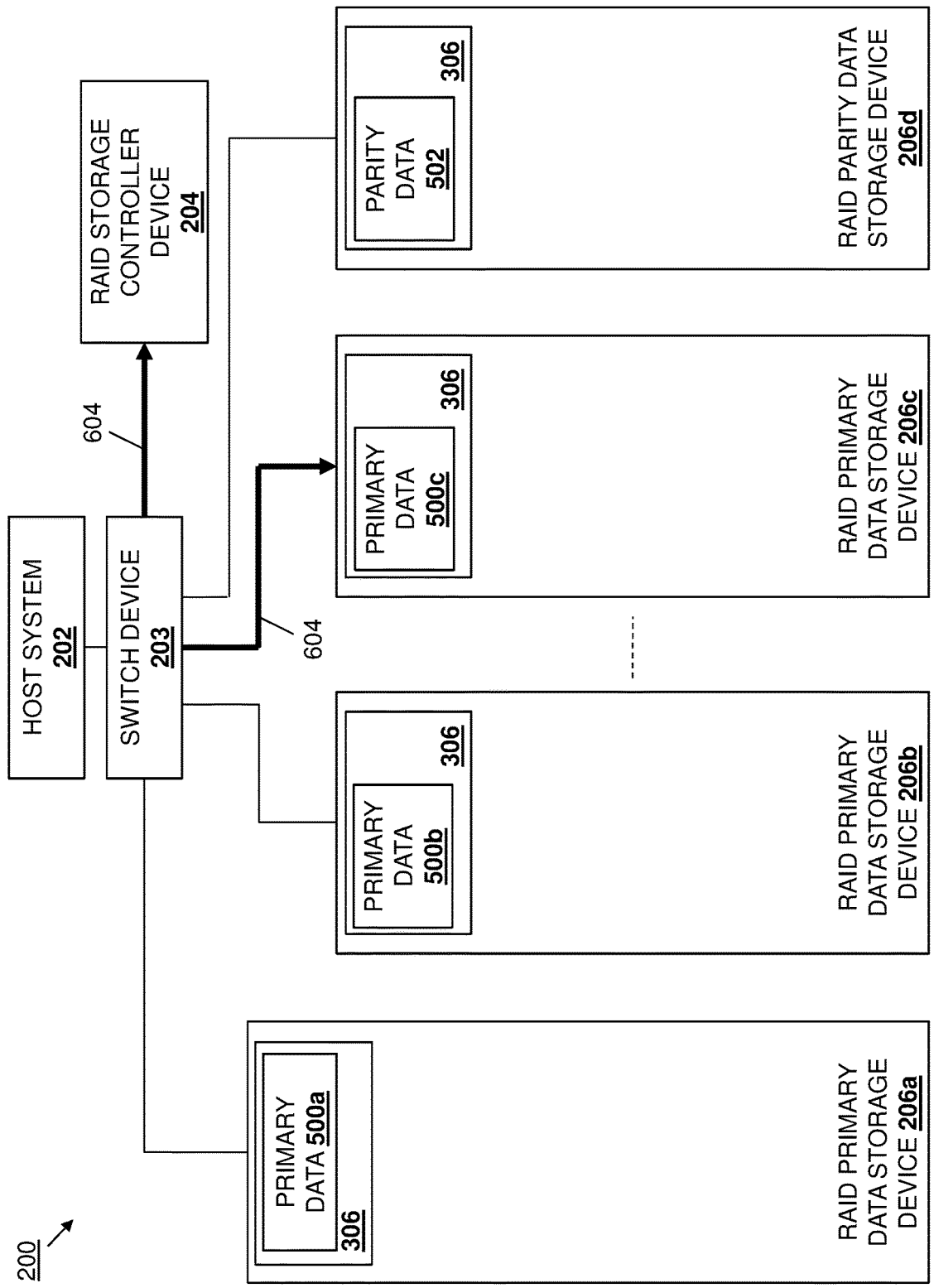
FIG. 6C is a schematic view illustrating an embodiment of the RAID data storage system of FIG. 2 operating during the method of FIG. 4.
Figure 6D:
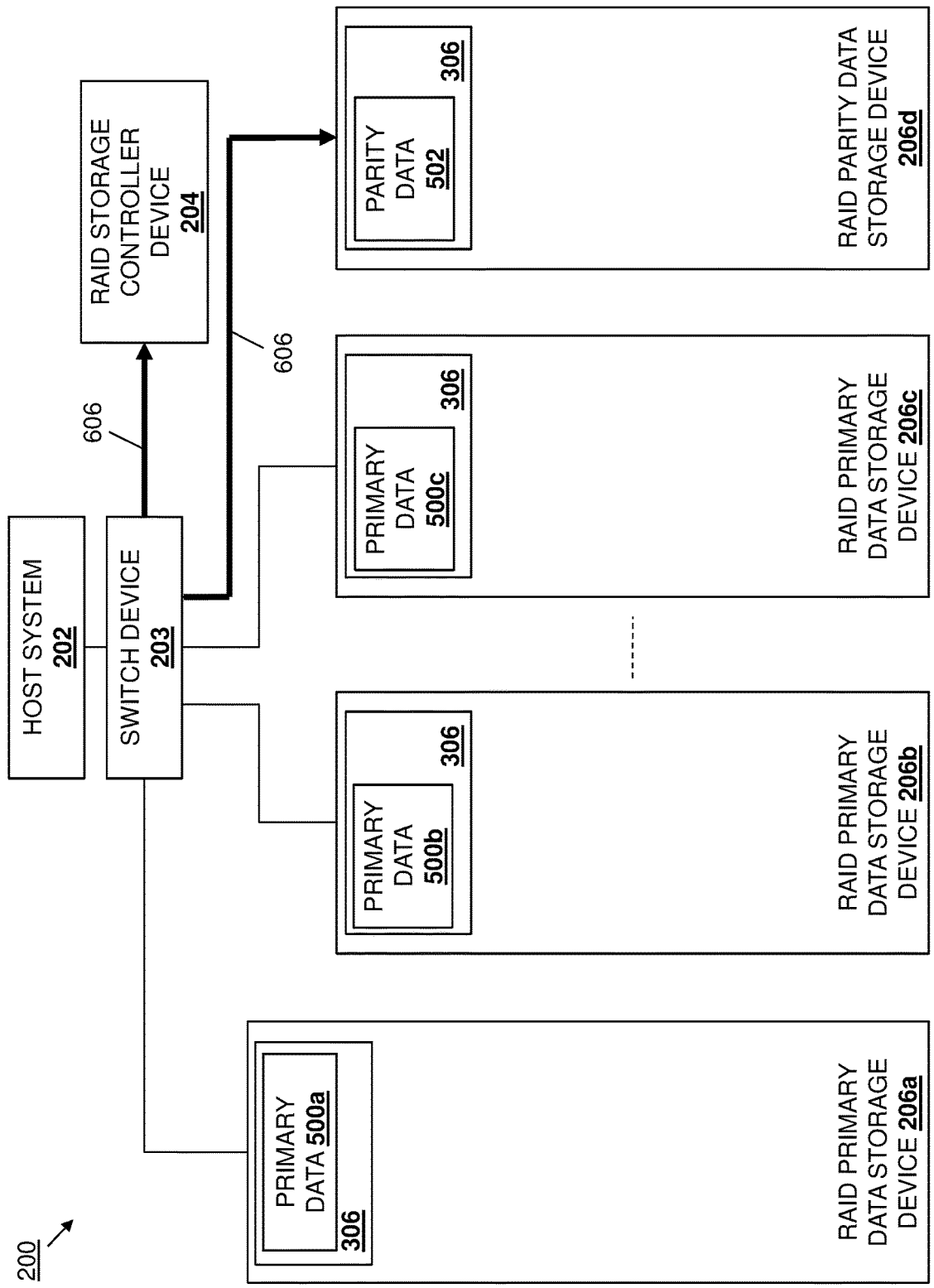
FIG. 6D is a schematic view illustrating an embodiment of the RAID data storage system of FIG. 2 operating during the method of FIG. 4.

Similarly as well, with reference to FIG. 6C, the RAID storage controller engine in the RAID storage controller device 204 may perform configuration communications 604 with the RAID primary data storage device 206c in order to configure at least some of the submission and completions queues utilized by the RAID primary data storage device 206c/RAID primary data storage device 206a pair, the RAID primary data storage device 206c/RAID primary data storage device 206b pair, and the RAID primary data storage device 206c/RAID parity data storage device 206d pair. Similarly as well, with reference to FIG. 6D, the RAID storage controller engine in the RAID storage controller device 204 may perform configuration communications 606 with the RAID parity data storage device 206d in order to configure at least some of the submission and completions queues utilized by the RAID parity data storage device 206d/RAID primary data storage device 206a pair, the RAID parity data storage device 206d/RAID primary data storage device 206b pair, and the RAID parity data storage device 206d/RAID primary data storage device 206c pair.

As will be appreciated by one of skill in the art in possession of the present disclosure, any of the configuration communications 600, 602, 604, and 606 may be substantially similar to the operations/communications described in U.S. patent application Ser. No. 16/838,224, filed on Apr. 2, 2020, and thus may result in the configuration of direct command operation submission and completion queues for each RAID data storage device pair that allows those RAID data storage devices to communicate directly with each other. As such, while not illustrated in the examples below, one of skill in the art in possession of the present disclosure will recognize that the submission and completion queues discussed in U.S. patent application Ser. No. 16/838,224, filed on Apr. 2, 2020, may be provided in the RAID data storage devices 206a-206d to enable the direct command operations discussed below. Furthermore, any or all of the configuration communications 600, 602, 604, and 606 may include the configuration of the RAID data storage devices 206a-206d that store primary data for a data stripe as part of multi-cast groups in order to enable the locking and unlocking communications discussed below.

The method 400 then proceeds to block 404 where a first RAID data storage device receives a data update command. The inventors of the present disclosure have developed techniques for providing multi-step commands to RAID data storage devices which are described in U.S. patent application Ser. No. 16/838,224 filed on Apr. 2, 2020, the disclosure of which is incorporated herein by reference in its entirety. As will be appreciated by one of skill in the art in possession of the present disclosure, that application describes flexible techniques for allowing a RAID storage controller device to send a single, multi-step command to a RAID storage device that expresses multiple steps of operations that RAID data storage device(s) in the RAID data storage system 200 should perform, thus offloading control processing and control communication transmissions from the RAID storage controller device.

For example, the generation of multi-step commands may include a RAID storage controller device coupled to a RAID storage system identifying a RAID storage system configuration of the RAID storage system and, based on that RAID storage system configuration, generating a first multi-step command definition file for a first RAID storage device that is included in the RAID storage system. The first multi-step command definition file may define a plurality of first steps that each include at least one first operation, and may be "tuned" to the first RAID storage device based on first RAID storage device configuration, the first RAID storage device capabilities, the operations that the first RAID storage device is expected to perform, the RAID storage controller device capabilities, and/or any other information that may be determined from the RAID storage system configuration. As such, while RAID data storage devices within a RAID data storage system/RAIDset are often homogeneous, different types of RAID data storage devices may be provided in a RAID data storage system and coupled to its RAID storage controller device, and the first multi-step command definition file may be different than second multi-step definition file(s) provided to second RAID data storage device(s) included in the RAID storage system.

The RAID storage controller device may then transmit the first multi-step command definition file to the first RAID storage device and, subsequent to transmitting the first multi-step command definition file, the RAID storage controller device may generate a first multi-step command that references the first multi-step command definition file and includes at least one first parameter for use in performing one or more first operations included in the plurality of first steps defined by the first multi-step command definition file. The RAID storage controller device may then transmit the first multi-step command to the first RAID storage device, which causes the first RAID storage device to carry out the first multi-step command based on the multi-step command definition file and using the at least one first parameter. As such, RAID storage controller devices may send a single command that is configured to cause a RAID storage device to perform multiple steps, each with one or more operation, rather than sending a respective command for each of those operations, thus increasing the ability of the RAID storage controller device to scale with high performance RAID storage devices, offloading control operations from the RAID storage controller device, and/or reducing the number of completion communications generated and transmitted by the RAID storage controller device (thus reducing its processing and data transmission overhead.) As such, while not discussed in detail herein, one of skill in the art in possession of the present disclosure will appreciate that the multi-step commands generated and transmitted by the RAID storage controller device 204 to any of the RAID data storage devices 206a-206d during the method 400 may be preceded by any of the multi-step command operations described in U.S. patent application Ser. No. 16/832,348, filed on Mar. 27, 2020.

The inventors of the present disclosure also describe techniques for providing an autonomous RAID data storage system in U.S. patent application Ser. No. 16/839,428, filed on Apr. 3, 2020 (the "autonomous RAID data storage system application"), the disclosure of which is incorporated herein by reference in its entirety. One of skill in the art in possession of the present disclosure will appreciate that the autonomous locking operations performed according to the teachings of the present disclosure may be incorporated into the teachings of the autonomous RAID data storage system application and, similarly as discussed in the autonomous RAID data storage system application, the method 400 may be performed for any of a variety of multi-step commands. Thus, while discussion below provides an example of the performance of locking operations associated with a "process write" multi-step command that is described in more detail in the autonomous RAID data storage system application, locking operations associated with a "degraded read" multi-step command, a "degraded write" multi-step command, and/or other multi-step commands discussed in the autonomous RAID data storage system application (e.g., other RAID data transfer operations, RAID maintenance operations such as the BackGround Initialization (BGI) maintenance operations and Consistency Check (CC) maintenance operations, etc.) will fall within the scope of the present disclosure as well.

Figure 7A:
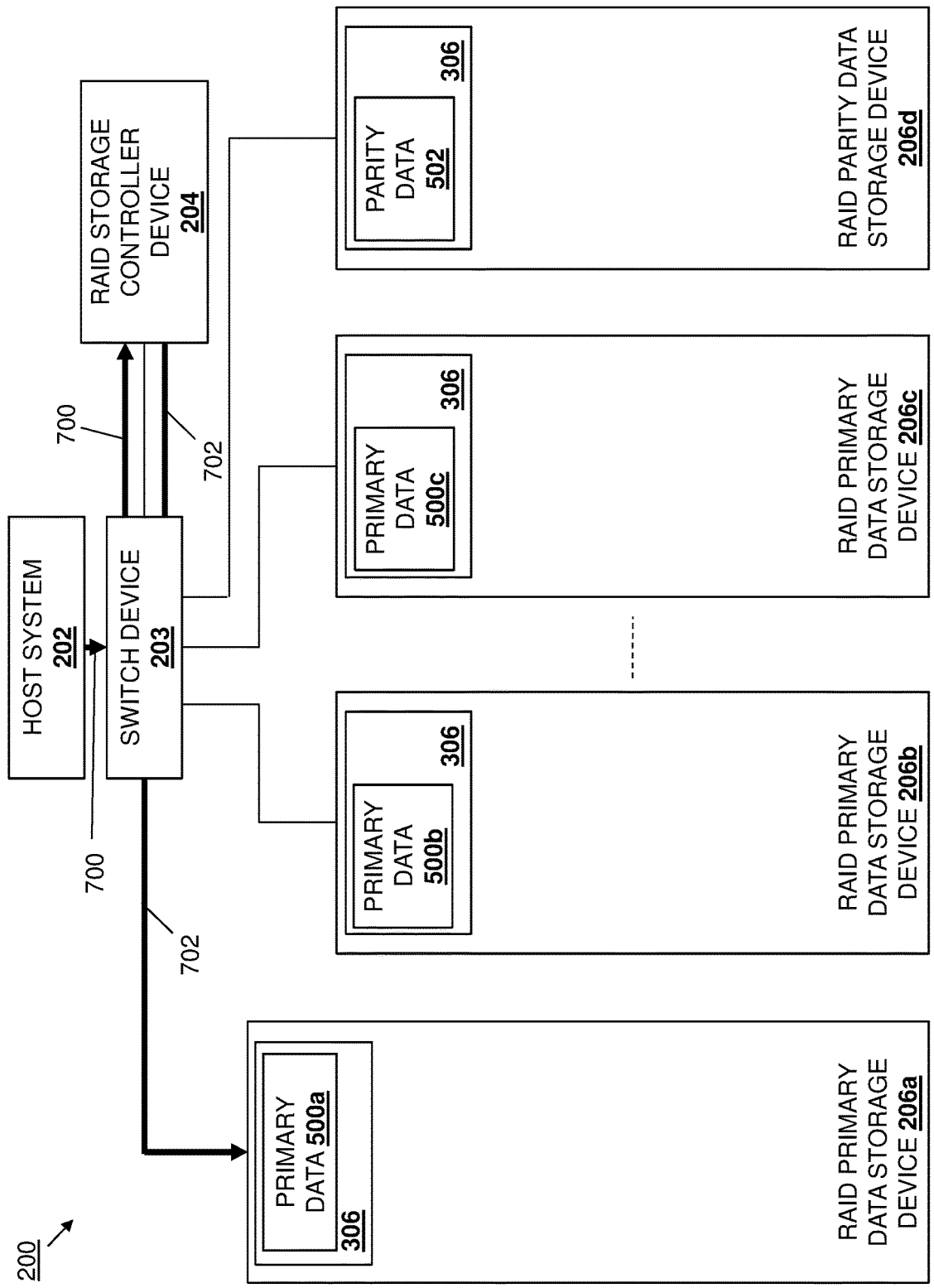
FIG. 7A is a schematic view illustrating an embodiment of the RAID data storage system of FIG. 2 operating during the method of FIG. 4.

As such, with reference to the "process write" embodiment discussed above and FIG. 7A, in an embodiment of block 404, the host system 202 may generate a write command 700 that instructs the writing of data stored in the host system 202 to RAID data storage device(s) in the RAID data storage system 200, and may transmit the write command 700 via the switch device 203 to the RAID storage controller device 204. In this example, the RAID storage controller engine in the RAID storage controller device 204 may receive that write command 700 and, in response, determine that the data identified in the write command 700 should be written to the RAID primary data storage device 206a. Thus, in this specific embodiment of block 404, the RAID storage controller engine in the RAID storage controller device 204 may then generate a "process write" multi-step command 702 for the RAID primary data storage device 206a, and transmit that "process write" multi-step command 702 command via the switch device 203 to the RAID primary data storage device 206a. As will be appreciated by one of skill in the art in possession of the present disclosure, the generation of the "process write" multi-step command 702 may include the performance of any of the pre-command operations described in U.S. patent application Ser. No. 16/832,348, filed on Mar. 27, 2020, and the "process write" multi-step command 702 may include any information needed for the RAID primary data storage device 206a and the RAID parity data storage device 206d to perform the functionality described below.

However, while the "process write" multi-step command 702 is illustrated and described below as being transmitted to the RAID primary data storage device upon which primary data is being updated, one of skill in the art in possession of the present disclosure will appreciate that a RAID primary data storage device that is not updating its primary data may receive the "process write" multi-step command 702 and cause another RAID primary data storage device to update its primary data (as well as perform the other operations discussed below) while remaining within the scope of the present disclosure as well.

In addition, at block 404, the RAID storage controller engine in the RAID storage controller device 204 may operate to generate a journal (or journal entry) that logs the generation and transmission of the "process write" multi-step command 702. As will be appreciated by one of skill in the art in possession of the present disclosure, journal operations such that those performed to log the generation and transmission of the "process write" multi-step command 702 in the journal in the RAID storage controller device 204 may be performed to create a record of the data transfer operation being performed such that, in the event of a power loss to the RAID data storage system 200 or other interruption to the data transfer operation, the data transfer operation may be resumed after power is restored and/or the interruption ends. As such, the journal in the RAID storage controller device 204 may identify that the write command 700 was received, that the "process write" multi-step command 702 was generated and transmitted to the RAID primary data storage device 206a, that no completion message has yet been received from the RAID primary data storage device 206a, and/or any other journal information that would be apparent to one of skill in the art in possession of the present disclosure.

The method 400 then proceeds to block 406 where the first RAID data storage device performs data update operations. In an embodiment, at block 406 and following the receiving of the "process write" multi-step command 702 by the RAID data storage engine 304 in the RAID primary data storage device 206a/300 via its communication subsystem 310, the RAID data storage engine 304 in the RAID primary data storage device 206a/300 may identify the steps in the "process write" multi-step command 702 and determine a first subset of operations in those steps that must be performed by the RAID primary data storage device 206a, a second subset of operations in those steps that must be performed by the RAID parity data storage device 206d, and RAID data storage devices 206b and 206c that should be locked during the performance of at least some of the first and second subsets of operations. However, while the example of the "process write" multi-step command 702 discussed below only involves operations by the RAID primary data storage device 206a and the RAID parity data storage device 206d, one of skill in the art in possession of the present disclosure will appreciate that multi-step commands may involve the performance of operations by any number of the RAID data storage devices while remaining within the scope of the present disclosure as well.

Figure 7B:
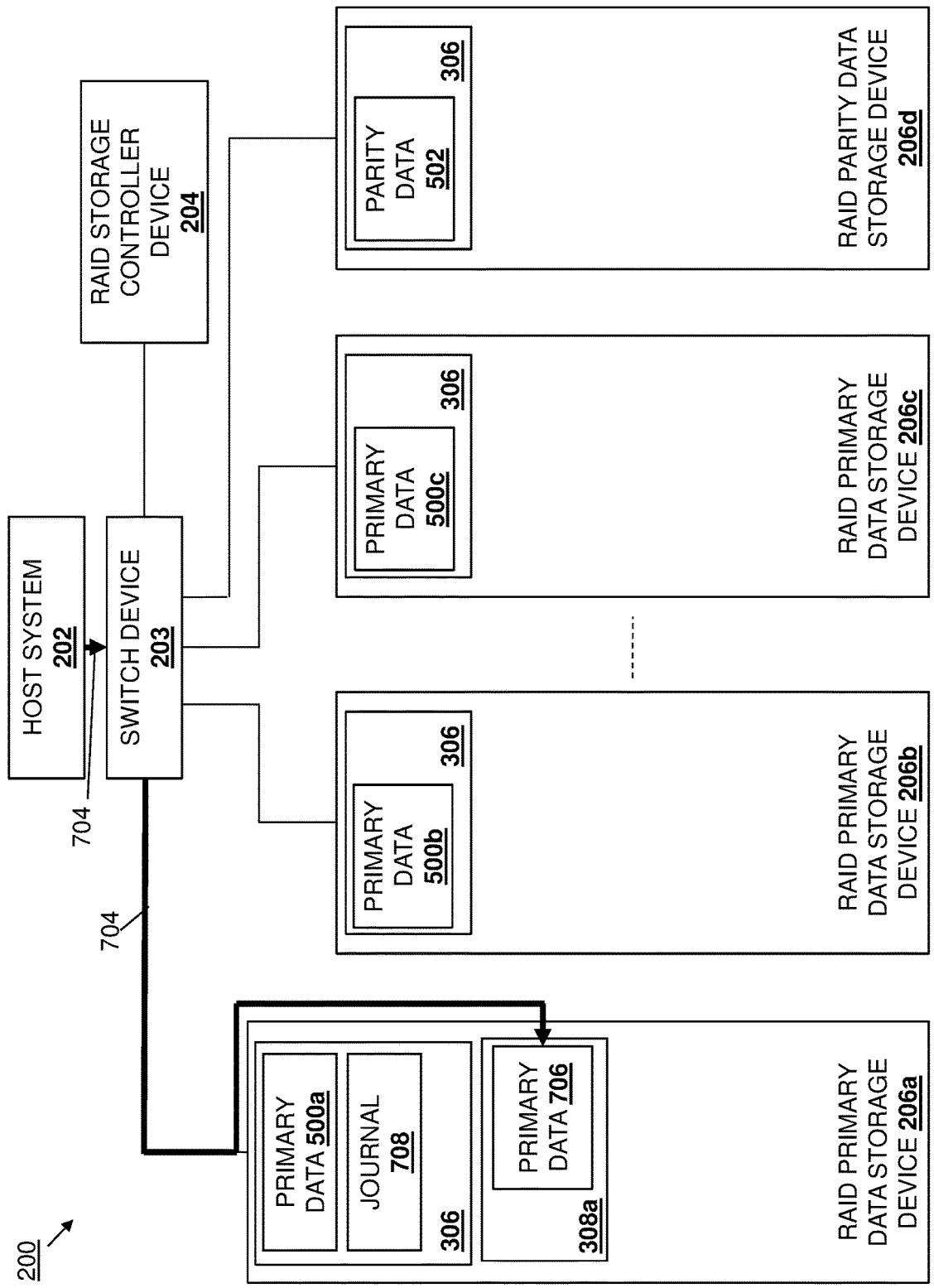
FIG. 7B is a schematic view illustrating an embodiment of the RAID data storage system of FIG. 2 operating during the method of FIG. 4.

With reference to FIG. 7B, first operation(s) in the first subset of operations included in the "process write" multi-step command 702 for performance by the RAID primary data storage device 206a may include the retrieval of "updated" primary data from the host system 202. As will be appreciated by one of skill in the art in possession of the present disclosure and as discussed above, the write command 700 generated by the host system 202 may identify "updated" primary data that is stored on the host system 202 and that should "update" or replace the "current" primary data 500a stored in the storage subsystem 306 of the RAID primary data storage device 206a. As such, at block 406, the RAID data storage engine 304 in the RAID primary data storage device 206a/300 may perform Direct Memory Access (DMA) operations 704 that access a memory system that is included in the host system 202 and that stores the "updated" primary data 706, and write that "updated" primary data 706 to its first buffer subsystem 308a (e.g., a device buffer) in the RAID primary data storage device 206a, as illustrated in FIG. 7B.

Furthermore, at block 406, the RAID data storage engine 304 in the RAID primary data storage device 206a/300 may operate to generate a journal 708 (or journal entry) that logs performance of any of the first operations(s) discussed above. As will be appreciated by one of skill in the art in possession of the present disclosure, journal operations such that those performed to log the performance of any of the first operations(s) discussed above may be performed to create a record of the data transfer operation being performed such that, in the event of a power loss to the RAID data storage system 200 or other interruption to the data transfer operation, the data transfer operation may be resumed after power is restored and/or the interruption ends. In particular, one of skill in the art in possession of the present disclosure will appreciate that the multiple operations autonomously performed by the RAID primary data storage device 206a are not visible to the RAID storage controller device 204, and thus may be tracked by the RAID primary data storage device 206a using the journal 708 such that those operations may be resumed after power is restored and/or the interruption ends. As such, the journal 708 may identify and be used to regularly update the status of any of the first operation(s) performed by the RAID primary data storage device 206a, and the RAID primary data storage device 206d may remove any of the entries for those first operation(s) from the journal 708 once they have been completed.

Figure 7C:
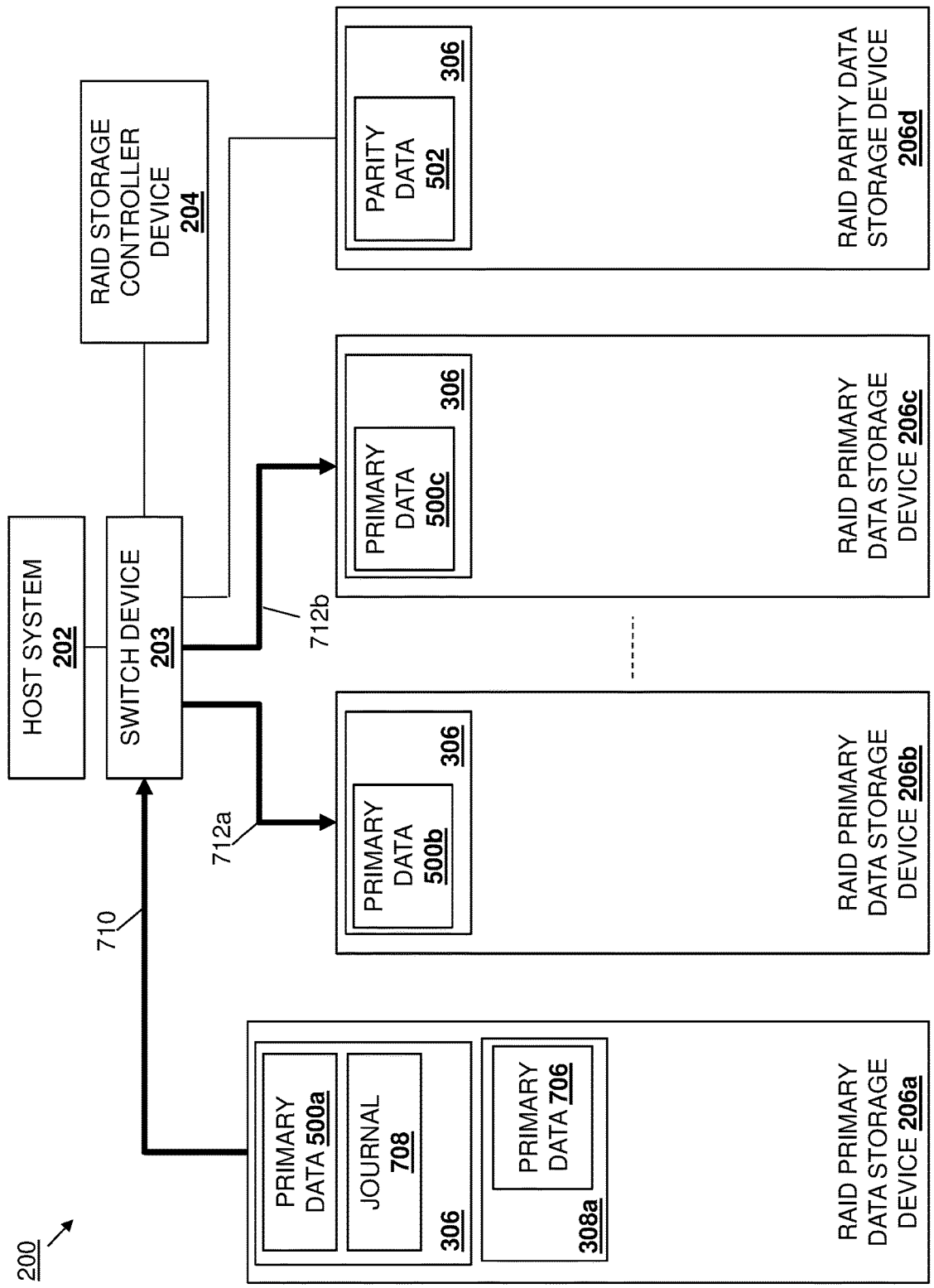
FIG. 7C is a schematic view illustrating an embodiment of the RAID data storage system of FIG. 2 operating during the method of FIG. 4.

The method 400 then proceeds to block 408 where the first RAID data storage device transmits a locking request to second RAID data storage device(s). In some embodiments, the locking requests transmitted by the RAID primary data storage device 206a to the RAID primary data storage devices 206b and 206c as discussed below may be NVMe locking requests. However, as illustrated in FIG. 7C, in an embodiment of block 408, the RAID data storage engine 304 in the RAID primary data storage device 206a may generate and transmit a multi-cast locking request 710 via its communication system 310 and to the switch device 203, which causes a locking request 712a to be transmitted to the RAID primary data storage device 206b and a locking request 712b to be transmitted to the RAID primary data storage device 206c. As will be understood by one of skill in the art in possession of the present disclosure, the updating of the "current" primary data 500a with the "updated" primary data 706 requires an update to the "current" parity data 502 in the storage subsystem 306 in the RAID parity data storage device 206d. Furthermore, the generation of that "updated" parity data requires that no change occur to the "current" primary data 500b in the storage subsystem 306 in the RAID primary storage device 206b and the "current" primary data 500c in the storage subsystem 306 in the RAID primary storage device 206c. In other words, the calculations performed to update the "current" parity data 502 below assumes that the "current" primary data 500b and 500c has not changed, and thus any change to that "current" primary data 500b and 500c during the generation of the "updated" parity data will result in that "updated" parity data being incorrect (i.e., unable to be used to rebuild the primary data 500b or 500c in the event it becomes unavailable.)

As such, at block 408, the RAID data storage engine 304 in the RAID primary data storage device 206a may generate and transmit the multi-cast locking request 710 to the multi-cast group (e.g., a PCIe multi-cast group) that includes the RAID primary storage devices 206b and 206c. In response to receiving the multi-cast locking request, the switch device 203 may transmit locking requests to each RAID primary data storage device that is part of the multi-cast group except for the originator of the multi-cast locking request 710, resulting in the transmission of the locking requests 712a and 712b to the RAID primary storage devices 206b and 206c, respectively, in the illustrated example. As will be appreciated by one of skill in the art in possession of the present disclosure, the multi-cast locking request 710 may be provided via a posted memory write transaction in order to fit into the conventional multicast paradigm, although other transactions that fit the conventional multi-cast paradigm will fall within the scope of the present disclosure as well. Thus, at block 408, the RAID data storage engine 304 in the RAID primary storage device 206b may receive the locking request 712a via its communication system 310, and the RAID data storage engine 304 in the RAID primary storage device 206c may receive the locking request 712b via its communication system 310.

The method 400 then proceeds to decision block 410 where it is determined whether a locking confirmation has been received. In an embodiment, at decision block 410 and following receiving the locking requests 712a and 712b, the RAID data storage engine 304 in the RAID primary storage devices 206b and 206c may process the locking requests 712a and 712b in order to attempt to lock out further writes to particular data stripes in their storage subsystems 306 (e.g., locking out writes to the data stripe including the primary data 500b and 500c, while still allowing writes to be processed for regions in the storage subsystems 306 that store data in other data stripes.) As will be appreciated by one of skill in the art in possession of the present disclosure, the processing of a locking request by a RAID data storage device may result in a successful locking operation that prevents further writes to the storage subsystem 306 in that RAID data storage device, a failed locking operation that does not prevent further writes to the storage subsystem 306 in that RAID data storage device, or a partial locking operation that prevents some writes to the storage subsystem 306 in that RAID data storage device.

As such, the RAID data storage engines 304 in the RAID primary storage devices 206b and 206c may be configured to report the status of their respective locking operations, and the RAID data storage engine 304 in the RAID primary storage device 206a may monitor for the status of the locking operation performed by the RAID primary storage devices 206b and 206c. While not discussed in detail below, one of skill in the art in possession of the present disclosure will appreciate that a failed locking operation or partial locking operation that does not lock primary data (which is included in the data stripe having the primary data that is being updated) will prevent the updating of parity data in the same data stripe. In such a situation, the RAID primary data storage device 206a requesting the locking operations will retry the locking requests until locking operations on the RAID primary data storage devices 206b and 206c have been performed. Such failed locking operations may occur when a write operation is being performed on the same LBA range in the storage subsystem 306 for which the lock is being requested and, as such, retries of the locking request will typically result in a successful lock.

If, at decision block 410, it is determined that a locking confirmation has not been received, the method 400 returns to decision block 410. As such, the method 400 may loop such that the RAID data storage engine 304 in the RAID primary storage device 206a may monitor for the status of the locking operation performed by the RAID primary storage devices 206b and 206c (and may repeat locking requests in the event of failed locking operations as discussed above) until successful or partial locking operations are performed by the RAID primary storage devices 206b and 206c in a manner that ensures that the data update operations discussed below may be performed without producing invalid "updated" parity data.

Figure 7D:
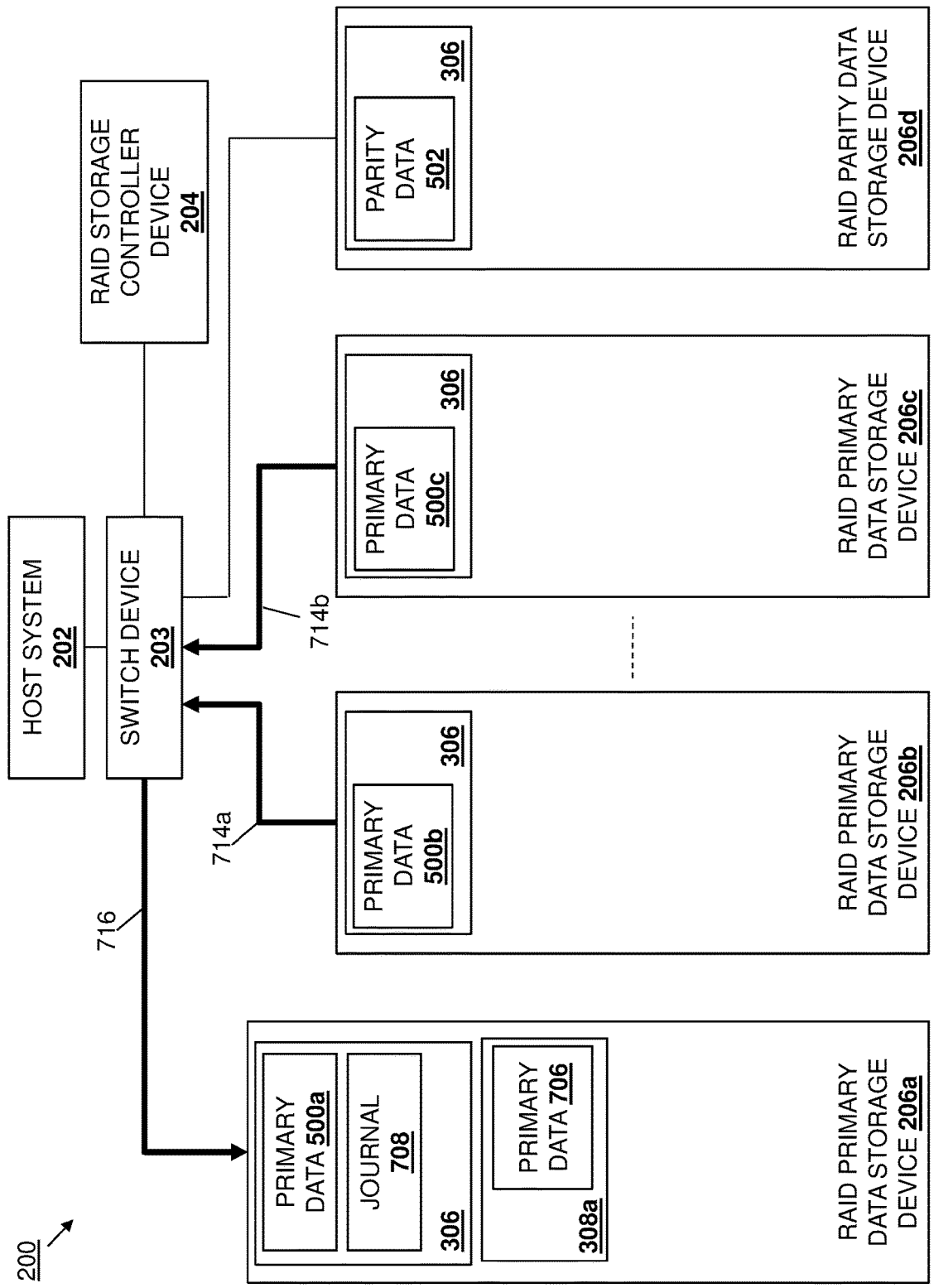
FIG. 7D is a schematic view illustrating an embodiment of the RAID data storage system of FIG. 2 operating during the method of FIG. 4.

If, at decision block 410, it is determined that a locking confirmation has been received, the method 400 proceeds to block 412 where the first RAID data storage device performs the data update operations. In an embodiment, in response to performing successful or partial locking operations in a manner that ensures that the data update operations discussed below may be performed without producing invalid "updated" parity data (i.e., locks are acquired such that no writes may occur on regions of the storage subsystems 306 that include the primary data 500b and 500c), the RAID data storage engine 304 in the RAID primary storage device 206b may generate and transmit a locking confirmation 714a, and the RAID data storage engine 304 in the RAID primary storage device 206c may generate and transmit a locking confirmation 714b, which may cause a locking confirmation 716 to be transmitted to the RAID primary data storage device 206a, as illustrated in FIG. 7D. For example, the switch device 203 may be configured to gather locking confirmations from the RAID primary data storage devices to which the locking requests were transmitted (e.g., the locking confirmations 714a and 714b from the RAID primary data storage devices 206b and 206c to which the locking requests 712a and 712b were transmitted) and, once those locking confirmations are received, may transmit a single locking confirmation (e.g., the locking confirmation 716) to the RAID primary data storage device 206a. As such, the switch device 203 may wait for each RAID primary data storage device to which a locking request was transmitted to acknowledge successful or partial locking operations before the locking confirmation is transmitted to the RAID primary data storage device that requested the locking. One of skill in the art in possession of the present disclosure will appreciate that the operations discussed above may be performed similarly to implicit routing/"gathered and routed" methods for Transaction Layer Packets (TLPs), but may require the defining of a new TLP and message (i.e., enhancements to PCIe).

Figure 7E:
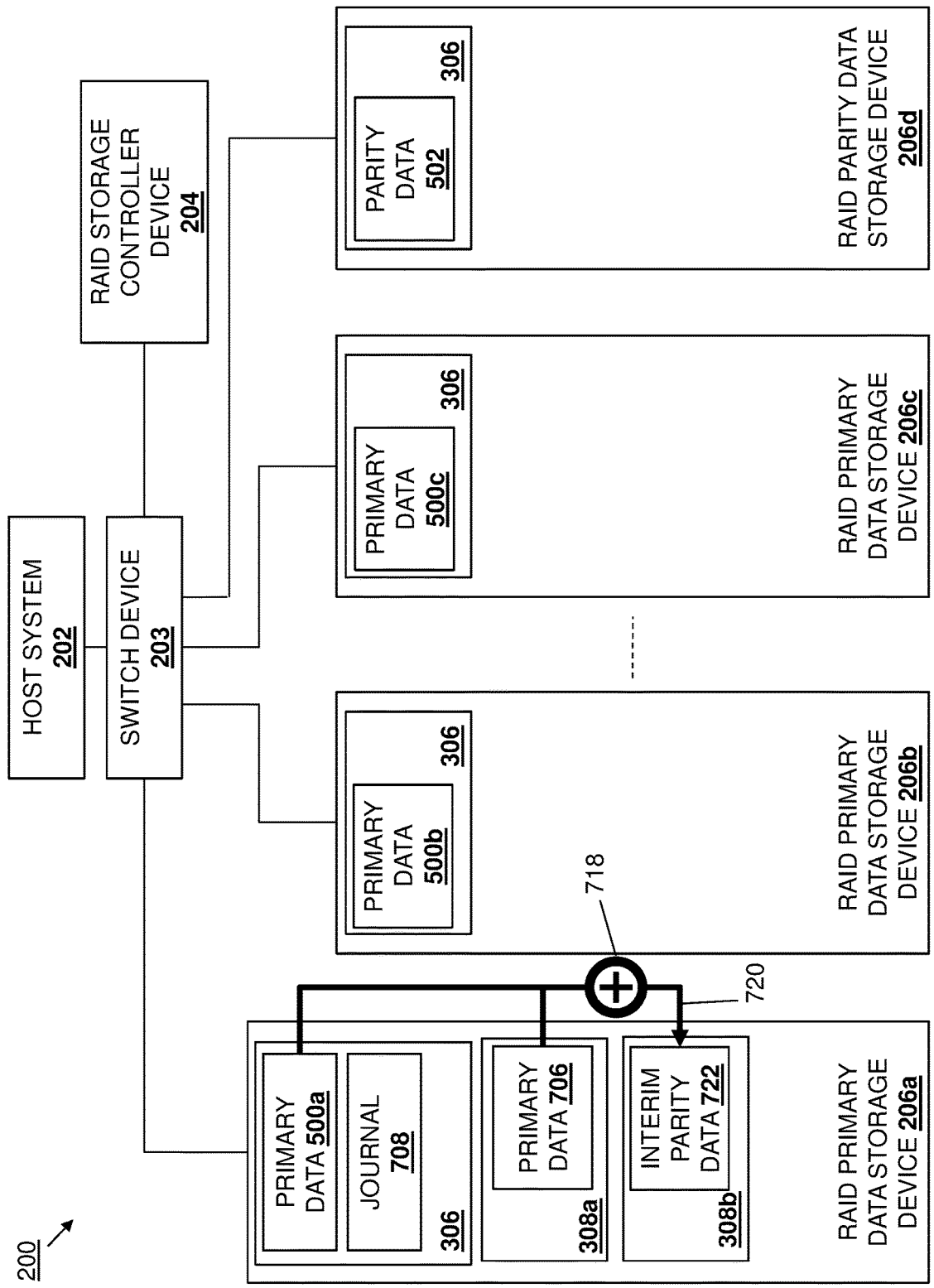
FIG. 7E is a schematic view illustrating an embodiment of the RAID data storage system of FIG. 2 operating during the method of FIG. 4.

As such, the RAID data storage engine 304 in the RAID data storage device 206a may receive the locking confirmation 716 at decision block 410 and, in response, may proceed to block 412 to continue performing the data update operations while the RAID primary data storage devices 206b and 206c are locked from further write operations to the regions of their storage subsystems 306 that store the primary data 500b and 500c. With reference to FIG. 7E, second operation(s) in the first subset of operations included in the multi-step command 702 for performance by the RAID primary data storage device 206a may include the calculation of interim parity data by the RAID primary data storage device 206a. As discussed above, the updating of "current" primary data with "updated" primary data in the RAID primary data storage device 206a changes the data stored on the RAID primary data storage device 206a for the data stripe that includes the primary data 500b and 500c, and the parity data 502, and thus requires an update to the parity data 502 stored in the storage subsystem 306 on the RAID parity data storage device 206d/300. Furthermore, the change in the data stored on the RAID primary data storage device 206a resulting from the updating of the "current" primary data 500a with the "updated" primary data 706 may be calculated via the performance of an XOR operation on the "current" primary data 500a and the "updated" primary data 706 to produce interim parity data.

As such, at block 406, the RAID data storage engine 304 in the RAID primary data storage device 206a/300 may perform XOR operations 718 on the "current" primary data 500a and the "updated" primary data 706 to generate interim parity data 722, and perform a write operation 720 to store that interim parity data 722 in its second buffer subsystem 308b (e.g., a CMB subsystem), as illustrated in FIG. 7E. As will be appreciated by one of skill in the art in possession of the present disclosure, in some embodiments the generation of the interim parity data may be performed while the locking operations are being performed on the RAID primary data storage devices 206b and 206c. Similarly as discussed above, in response to beginning any of the second operation(s) in the first subset of operations, the RAID data storage engine 304 in the RAID primary data storage device 206a/300 may add journal entries corresponding to those first subset of operations to the journal 708, and in response to completing any of the first subset of operations associated with the multi-step command 702, the RAID data storage engine 304 in the RAID primary data storage device 206a/300 may remove journal entries corresponding to those first subset of operations from the journal 708. As will be appreciated by one of skill in the art in possession of the present disclosure, the XOR operations to generate the interim parity data 722 and the write operations on the interim parity data 722 discussed above may be performed before the locking requests and confirmations illustrated in FIGS. 7C and 7D in order to, for example, reduce the time period in which the RAID primary data storage devices 206b and 206c are locked to minimize the impact on the performance of those RAID primary data storage devices 206b and 206c.

Figure 7F:
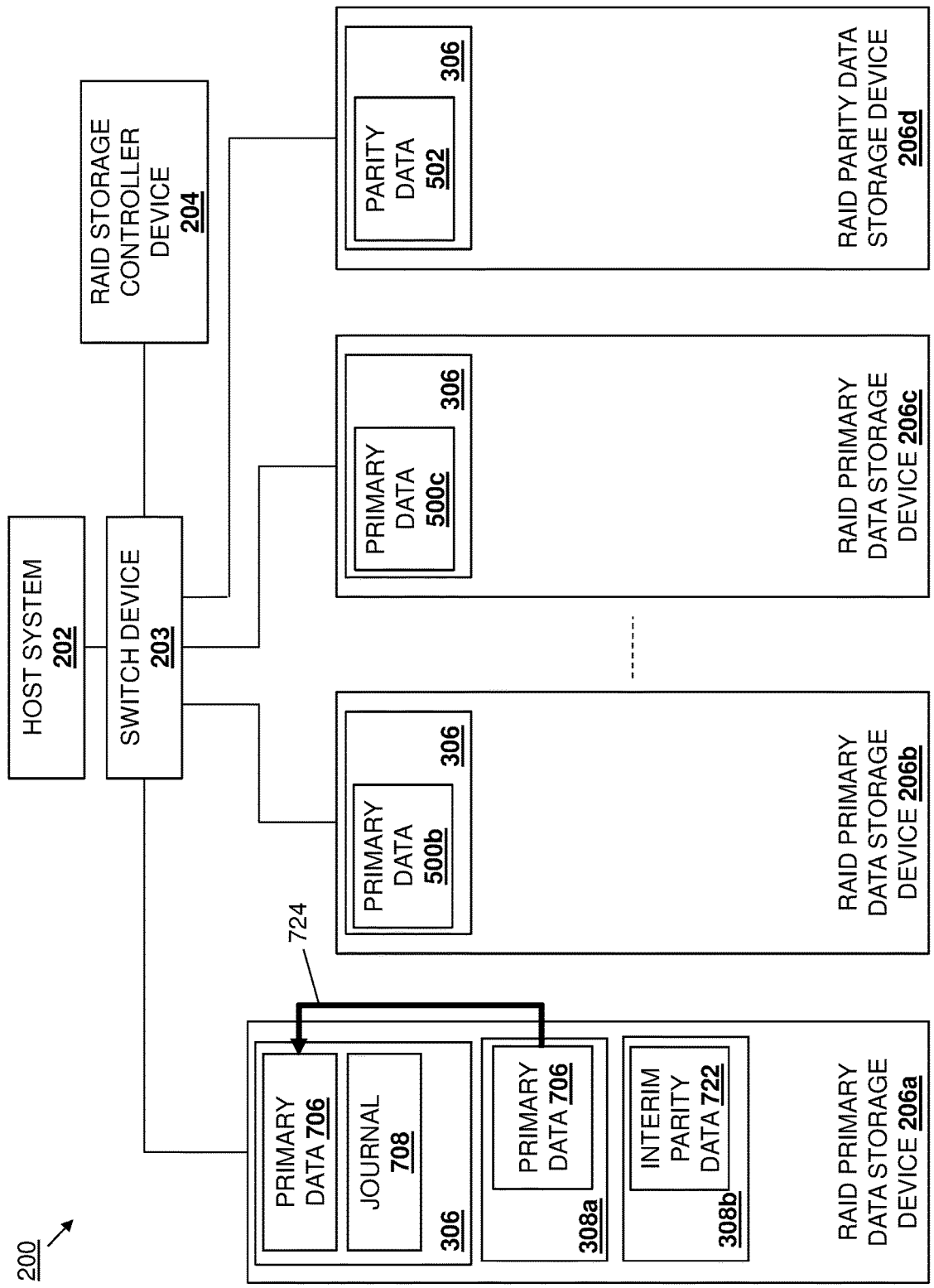
FIG. 7F is a schematic view illustrating an embodiment of the RAID data storage system of FIG. 2 operating during the method of FIG. 4.

With reference to FIG. 7F, third operation(s) in the first subset of operations included in the multi-step command 702 for performance by the RAID primary data storage device 206a may include the updating of "current" primary data with "updated" primary data. In an embodiment, at block 412, the RAID data storage engine 304 in the RAID primary data storage device 206a/300 may perform an overwrite operation 724 in order to overwrite the "current" primary data 500a stored on its storage subsystem 306 with the "updated" primary data 706 stored in its second buffer subsystem 308b, as illustrated in FIG. 7F. Similarly as discussed above, in response to beginning any of the third operation(s) in the first subset of operations, the RAID data storage engine 304 in the RAID primary data storage device 206a/300 may add journal entries corresponding to those first subset of operations to the journal 708, and in response to completing any of the first subset of operations associated with the multi-step command 702, the RAID data storage engine 304 in the RAID primary data storage device 206a/300 may remove journal entries corresponding to those first subset of operations from the journal 708.

In this embodiment, block 412 of the method 400 may include the first RAID data storage device performing direct command operations with a second RAID data storage device in order to cause the second RAID data storage device to perform the data update operations. As discussed above, following the receiving of the "process write" multi-step command 702, the RAID data storage engine 304 in the RAID primary data storage device 206a/300 may identify the steps in the "process write" multi-step command 702 and determine the second subset of operations in those steps that must be performed by the RAID parity data storage device 206d. In the example below, the second subset of operations includes the updating of "current" parity data with "updated" parity data, but one of skill in the art in possession of the present disclosure will appreciate that subsets of operations performed by other RAID data storage devices may include a variety of operations that will fall within the scope of the present disclosure as well.

Figure 7G:
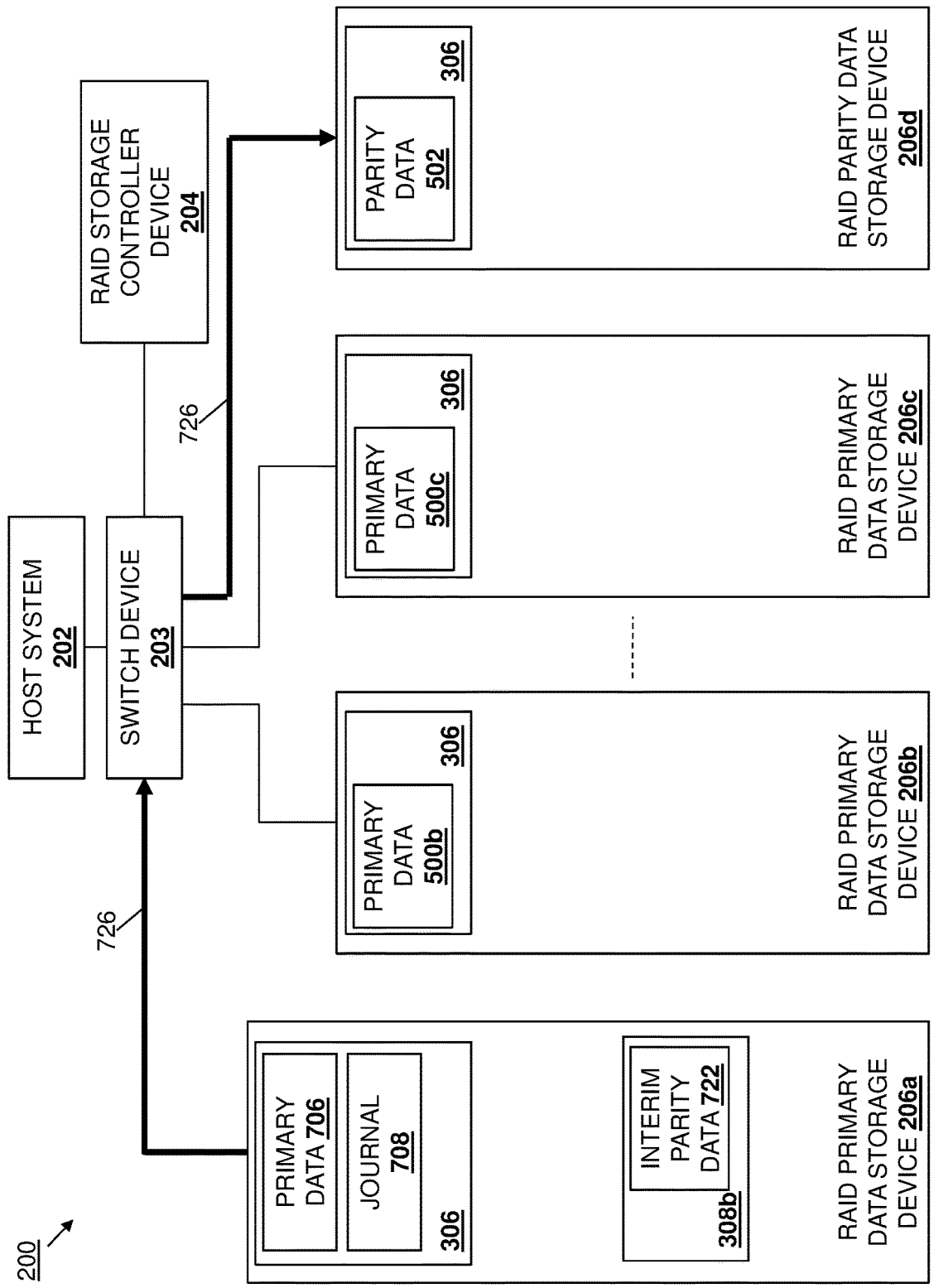
FIG. 7G is a schematic view illustrating an embodiment of the RAID data storage system of FIG. 2 operating during the method of FIG. 4.

With reference to FIG. 7G, in an embodiment of block 412, the RAID data storage engine 304 in the RAID primary data storage device 206a may generate a peer-to-peer multi-step command that instructs the updating of "current" parity data with "updated" parity data. As will be appreciated by one of skill in the art in possession of the present disclosure, the generation of the peer-to-peer multi-step command may include the performance of any of the pre-command operations described in U.S. patent application Ser. No. 16/832,348, filed on Mar. 27, 2020, and the peer-to-peer multi-step command may include any information needed for the RAID parity data storage device 206d to perform the functionality described below. The RAID data storage engine 304 in the RAID primary data storage device 206a may then perform direct command operations 726 to transmit the peer-to-peer multi-step command via the switch device 203 to the RAID parity data storage device 206d, as illustrated in FIG. 7G. As will be appreciated by one of skill in the art in possession of the present disclosure, the direct command operations 726 may include any of the operations described in U.S. patent application Ser. No. 16/838,224, filed on Apr. 2, 2020, that allow the RAID primary data storage device 206a to transmit the peer-to-peer multi-step command directly to the RAID parity data storage device 206d.

In this embodiment, block 412 of the method 400 may include the second RAID data storage device performing a second subset of operations associated with the multi-step command 702. In an embodiment, following the receiving of the peer-to-peer multi-step command by the RAID data storage engine 304 in the RAID parity data storage device 206d/300 via its communication subsystem 310, the RAID data storage engine 304 in the RAID parity data storage device 206d/300 may identify the second subset of operations included in the peer-to-peer multi-step command for performance by the RAID parity data storage device 206d.

Figure 7H:
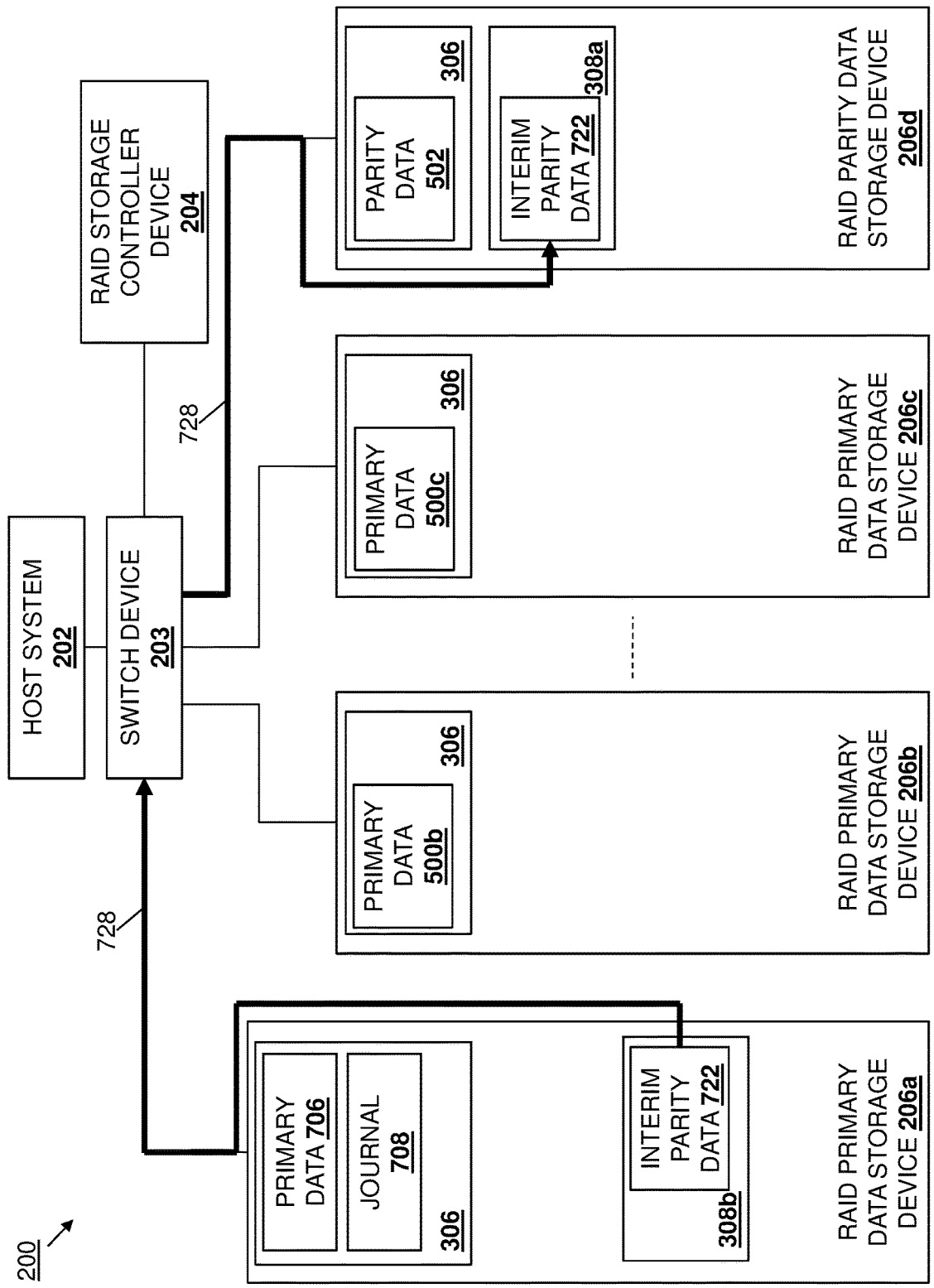
FIG. 7H is a schematic view illustrating an embodiment of the RAID data storage system of FIG. 2 operating during the method of FIG. 4.

With reference to FIG. 7H, first operation(s) in the second subset of operations included in the peer-to-peer multi-step command for performance by the RAID parity data storage device 206d may include the retrieval of interim parity data from the RAID primary data storage device 206a. As discussed above, the updating of "current" primary data with "updated" primary data in the RAID primary data storage device 206a changes the data stored on the RAID primary data storage device 206a for the data stripe that includes the primary data 500b and 500c and the parity data 502, and thus requires an update to the "current" parity data 502 stored in the storage subsystem 306 on the RAID parity data storage device 206d/300. Furthermore, the change in the data stored on the RAID primary data storage device 206a resulting from the updating of the "current" primary data 500a with the "updated" primary data 706 was previously calculated via the performance of an XOR operation on the "current" primary data 500a and the "updated" primary data 706 to produce the interim parity data 722 stored in the second buffer subsystem 308b (e.g., a CMB subsystem) in the RAID data storage device 206a. As such, at block 410, the RAID data storage engine 304 in the RAID parity data storage device 206b/300 may perform DMA operations 728 that access the interim parity data 722 in the second buffer subsystem 308b in the RAID primary data storage device 206a, and may write that interim parity data 722 to a first buffer subsystem 308a (e.g., a device buffer) in the RAID parity data storage device 206d/300, as illustrated in FIG. 7H.

Figure 7I:
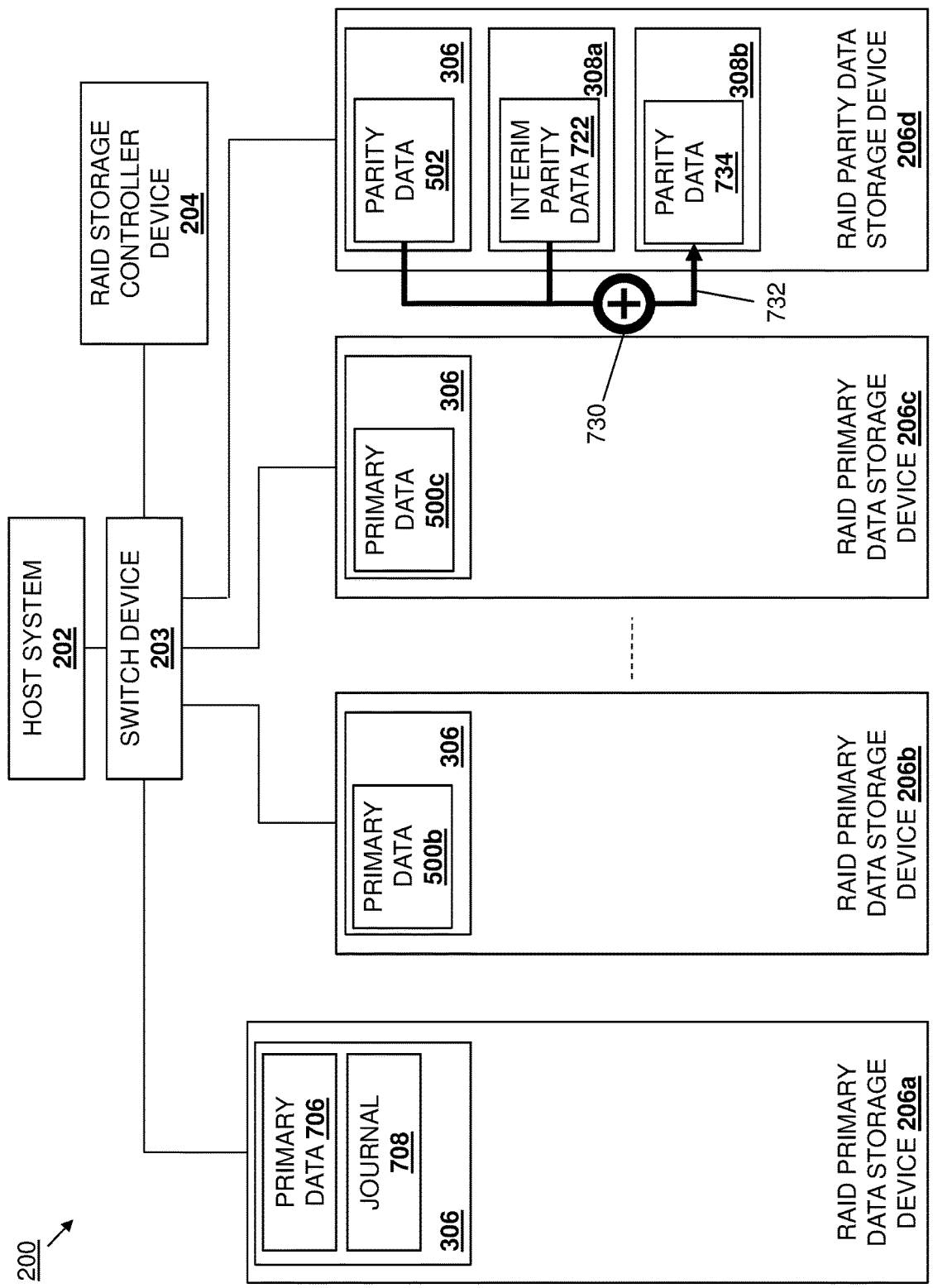
FIG. 7I is a schematic view illustrating an embodiment of the RAID data storage system of FIG. 2 operating during the method of FIG. 4.

With reference to FIG. 7I, second operation(s) in the second subset of operations included in the peer-to-peer multi-step command for performance by the RAID parity data storage device 206d may include the calculation of "updated" parity data. As discussed above, the change in the data stored on the RAID primary data storage device 206a resulting from the updating of the "current" primary data 500a with the "updated" primary data 706 may be calculated via the performance of an XOR operation on the "current" primary data 500a and the "updated" primary data 706 to produce the interim parity data 722, and an XOR operation performed on "current" parity data and that interim parity data 722 will produce "updated" parity data that takes into account the "updated" primary data 706. As such, at block 412, the RAID data storage engine 304 in the RAID parity data storage device 206d/300 may perform an XOR operation 730 on the "current" parity data 502 in its storage system 206 and the interim parity data 722 in its first buffer subsystem 308a to produce "updated" parity data 734, and may perform a write operation 732 to write the "updated" parity data 734 to its second buffer subsystem 308b (e.g., a CMB subsystem), as illustrated in FIG. 7I.

As will be appreciated by one of skill in the art in possession of the present disclosure, impacts on the performance of the RAID data storage system 200 may be decreased by only locking the RAID primary data storage devices 206b and 206c during the retrieval of the interim parity data 722 and the XOR operations on the interim parity data 722 and the "current" parity data 502 to generate the "updated" parity data 734. As such, in some embodiments, the RAID primary data storage device 206a may transmit the locking requests discussed above at substantially the same time as transmitting the multi-step command discussed above.

Figure 7J:
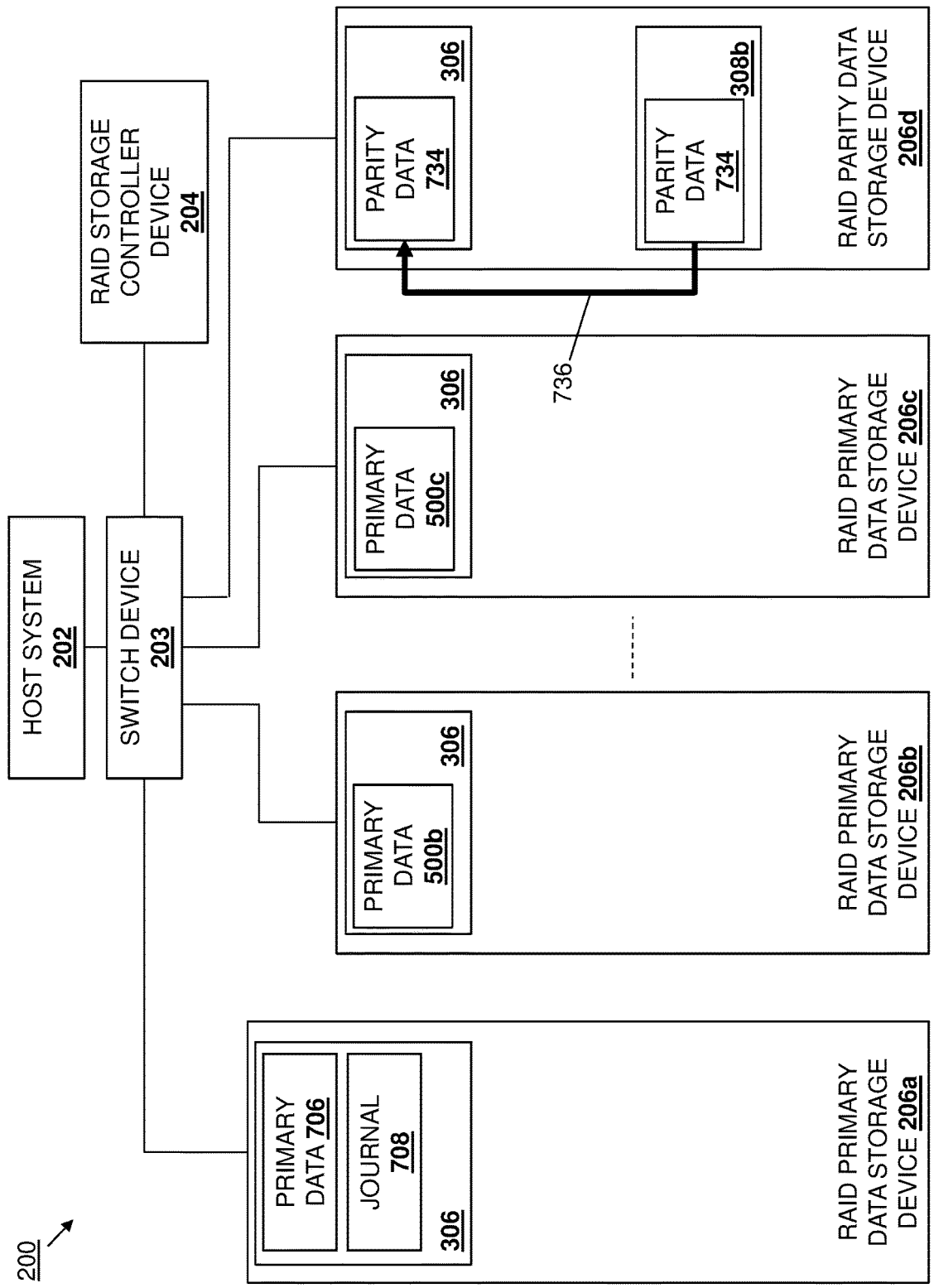
FIG. 7J is a schematic view illustrating an embodiment of the RAID data storage system of FIG. 2 operating during the method of FIG. 4.

With reference to FIG. 7J, third operation(s) in the second subset of operations included in the peer-to-peer multi-step command for performance by the RAID parity data storage device 206d may include the updating of "current" parity data with "updated" parity data. In an embodiment, at block 412, the RAID data storage engine 304 in the RAID parity data storage device 206d/300 may perform an overwrite operation 736 in order to overwrite the "current" parity data 502 stored on its storage subsystem 306 with the "updated" parity data 734 stored in its second buffer subsystem 308b, as illustrated in FIG. 7J. While not illustrated or described above, one of skill in the art in possession of the present disclosure will recognize that in some embodiments, the performance of the second subset of operations performed by the RAID parity data storage device 206d may include journal tracking and updating that is similar to that described above for the first subset of operations performed by the RAID primary data storage device 206a. For example, each of the first operation(s), second operation(s), and third operation(s) performed as part of the second subset of operations by the RAID parity data storage device 206d may include the RAID parity data storage device 206d sending status messages (e.g., an "operation begun" status, an "operation completed" status, etc.) to the RAID primary data storage device 206a so that the RAID primary data storage device 206a may update the journal 708 for those operations as they are performed.

While the method 400 is illustrated and described above with blocks 406, 408, and 410 being performed in sequence, those blocks may be performed in different orders, at the same time, and/or in other manners that will fall within the scope of the present disclosure as well. For example, after receiving the multi-step command 702, the RAID primary data storage device 206a may begin performing the first subset of operations associated with the multi-step command 702. The RAID primary data storage device 206a may then perform the direct command operations with the RAID parity data storage device 206d once the interim parity data 722 data has been generated (or will soon be generated) so that the RAID parity data storage device 206d may begin performing the second subset of operations associated with the multi-step command 702 (e.g., calculating "updated" parity data and overwriting "current" parity data with the "updated" parity data) while the RAID primary data storage device 206a completes the first subset of operations associated with the multi-step command 702 (e.g., overwriting "current" primary data with "updated" primary data.) As such, one of skill in the art in possession of the present disclosure will appreciate that the autonomous operations by the RAID data storage devices 206a-206d may be performed in a variety of manners that may increase the efficiency and speed of those operations while remaining within the scope of the present disclosure.

The method 400 then proceeds to decision block 414 where it is determined whether the data update operations have been completed. In an embodiment, at decision block 414, the RAID data storage engine 304 in the RAID primary data storage device 206a/300 may monitor its performance of the first subset of operations associated with the multi-step command 702, and the performance by the RAID parity data storage device 206d of the second subset of operations associated with the multi-step command 702, to determine whether they have been completed. As discussed above, in response to completing any of the first subset of operations associated with the multi-step command 702, the RAID data storage engine 304 in the RAID primary data storage device 206a/300 may remove journal entries corresponding to those first subset of operations from the journal 708. If, at decision block 412, it is determined that all of the first subset of operations and the second subset of operations have not been completed, the method 400 returns to decision block 412. As such, the method 400 may loop such that the data update operations associated with the multi-step command 702 are performed (e.g., by the RAID primary data storage device 206a and the RAID parity data storage device 206d in this example) until they are completed.

Figure 7K:
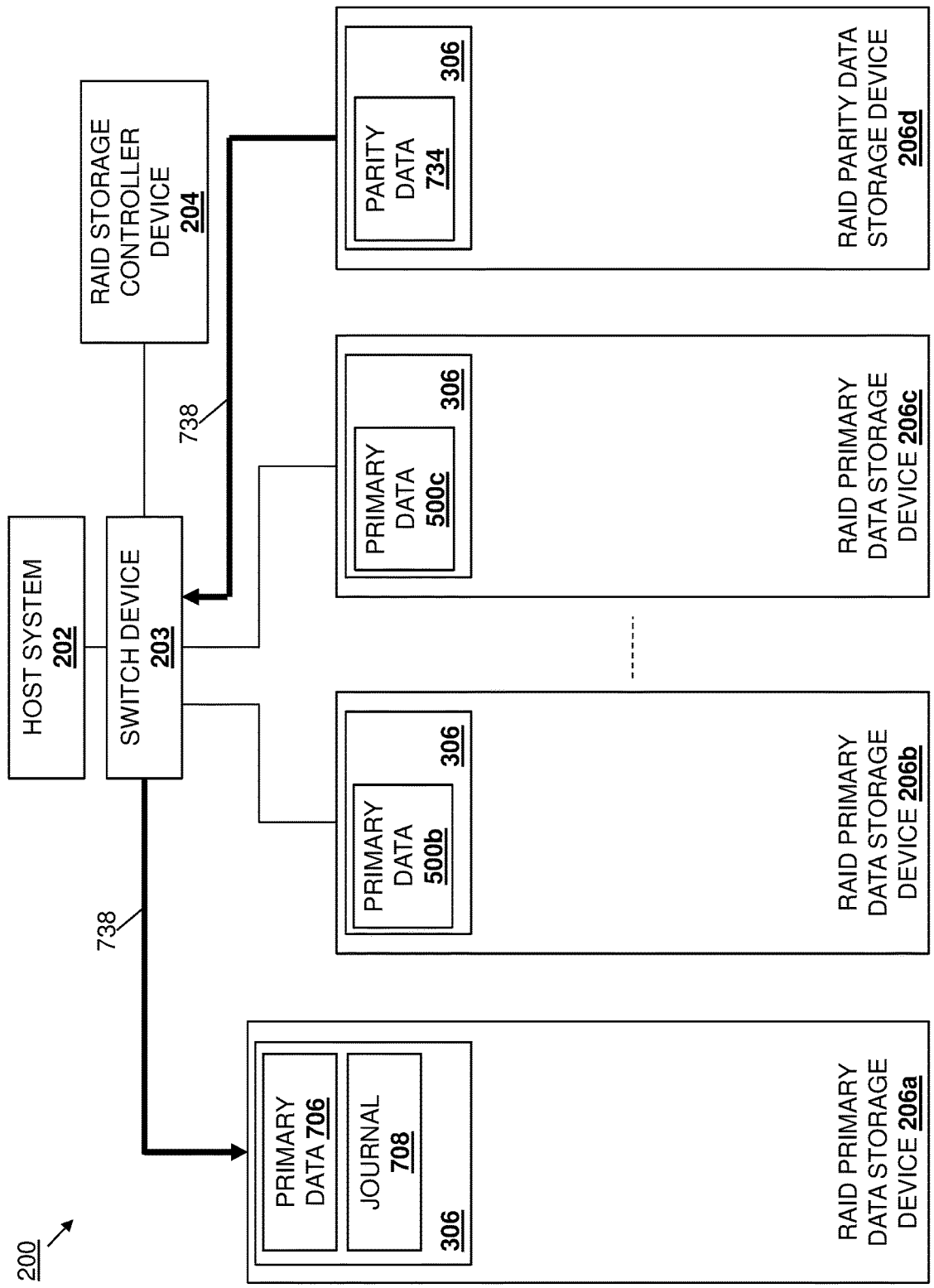
FIG. 7K is a schematic view illustrating an embodiment of the RAID data storage system of FIG. 2 operating during the method of FIG. 4.

If at decision block 414, it is determined that the data update operations have been completed, the method 400 proceeds to block 416 where the first RAID data storage device transmits an unlocking request to the second RAID data storage device(s). In an embodiment, at decision block 414, the RAID data storage engine 304 in the RAID primary data storage device 206a may determine that is has completed the first subset of operations, and that a completion communication has been received from the RAID parity data storage device 206d. For example, at decision block 414 and in response to transmitting the peer-to-peer multi-step command to the RAID parity data storage device 206d, the RAID data storage engine 304 in the RAID primary data storage device 206a/300 may monitor for a completion communication from the RAID parity data storage device 206d that indicates that the second subset of operations associated with the multi-step command 702 have been completed. As such, at decision block 414 and in response to completing the second subset of operations associated with the multi-step command 702, the RAID data storage engine 304 in the RAID parity data storage device 206d/300 may perform direct command operations 738 to transmit a peer-to-peer completion communication via the switch device 203 and to the RAID primary data storage device 206a, as illustrated in FIG. 7K. As will be appreciated by one of skill in the art in possession of the present disclosure, the direct command operations 738 may include any of the operations described in U.S. patent application Ser. No. 16/838,224, filed on Apr. 2, 2020, that allow the RAID parity data storage device 206d to transmit the peer-to-peer completion communication directly to the RAID primary data storage device 206a.

Figure 7L:
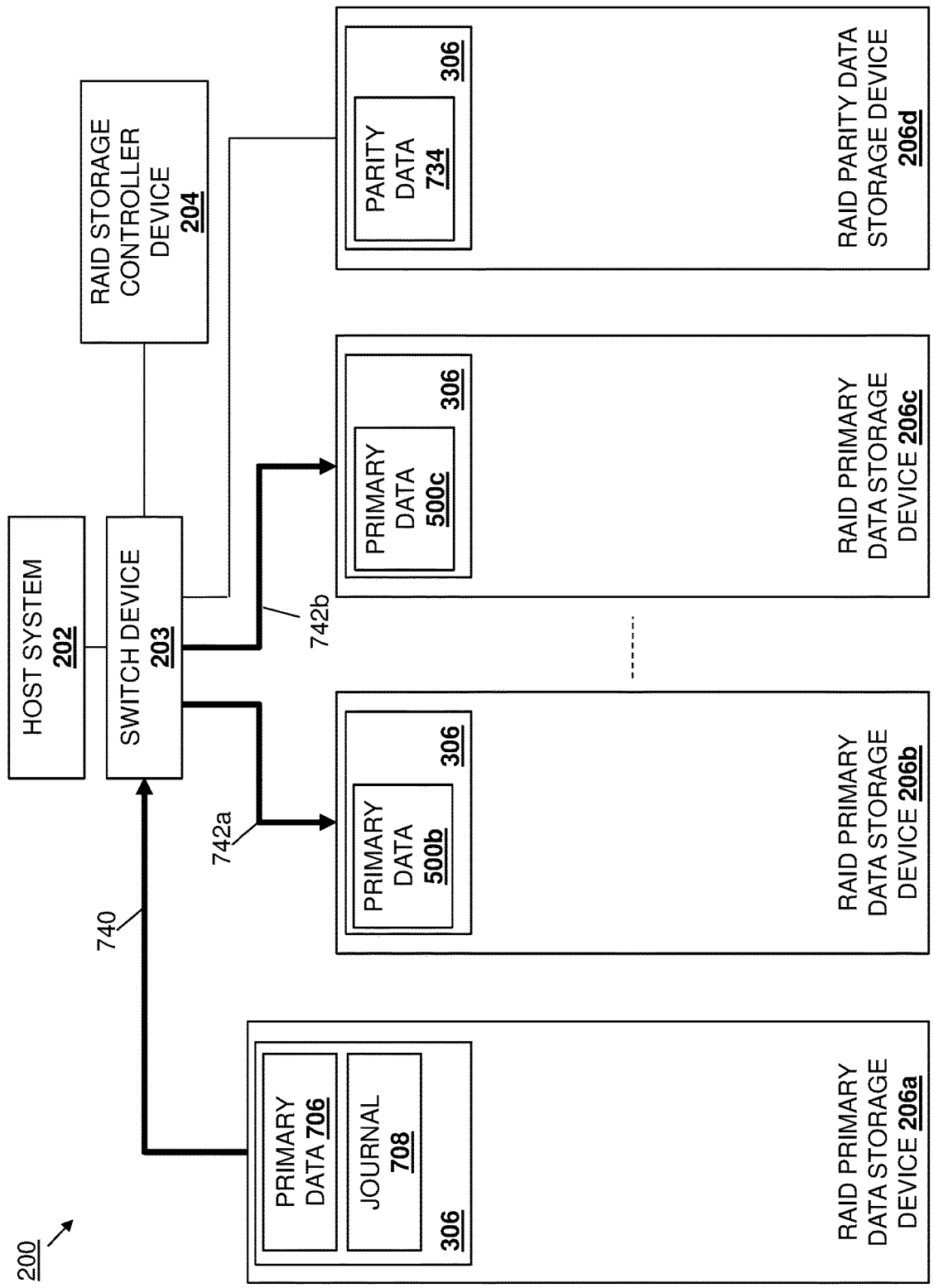
FIG. 7L is a schematic view illustrating an embodiment of the RAID data storage system of FIG. 2 operating during the method of FIG. 4.

At block 416 and in response to the data update operations being completed. The RAID data storage engine 304 in the RAID primary data storage device 206a may transmit unlocking requests to the RAID primary data storage devices 206b and 206c. In some embodiments, the unlocking requests transmitted by the RAID primary data storage device 206a to the RAID primary data storage devices 206b and 206c may be NVMe unlocking requests. However, as illustrated in FIG. 7L, in response to determining that is has completed the first subset of operations and that a completion communication has been received from the RAID parity data storage device 206d, the RAID data storage engine 304 in the RAID primary data storage device 206a may generate and transmit a multi-cast unlocking request 740 via its communication system 310, which causes an unlocking request 742a to be transmitted to the RAID primary data storage device 206b and an unlocking request 742b to be transmitted to the RAID primary data storage device 206c. As will be understood by one of skill in the art in possession of the present disclosure, following the updating of the "current" primary data 500a with the "updated" primary data 706 and the updating of the "current" parity data 502 with the "updated" parity data 734, the data stripe including the primary data 706, 500b, and 500c and the parity data 734 is consistent, and changes may now be allowed to the primary data 500b and/or 500c if necessary.

As such, at block 416, the RAID data storage engine 304 in the RAID primary data storage device 206a may generate and transmit the multi-cast unlocking request 740 to the multi-cast group (e.g., a PCIe multi-cast group) that includes the RAID primary storage devices 206b and 206c. In response to receiving the multi-cast locking request, the switch device 203 may transmit unlocking requests to each RAID primary data storage device that is part of the multi-cast group except the originator of the multi-cast unlocking request 740, resulting in the transmission of the locking requests 742a and 742b to the RAID primary storage devices 206b and 206c, respectively, in the illustrated example. Similarly as discussed above, the multi-cast unlocking request 740 may be provided via a posted memory write transaction in order to fit into the conventional multicast paradigm, although other transactions that fit the conventional multi-cast paradigm will fall within the scope of the present disclosure as well. Thus, at block 416, the RAID data storage engine 304 in the RAID primary data storage device 206*b* may receive the unlocking request 742*a* via its communication system 310 and may operate to unlock the RAID primary data storage device 206*b* in order to allow writes to its storage subsystem 306. Similarly, the RAID data storage engine 304 in the RAID primary data storage device 206*c* may receive the unlocking request 742*b* via its communication system 310 and may operate to unlock the RAID primary data storage device 206*c* in order to allow writes to its storage subsystem 306. As will be appreciated by one of skill in the art in possession of the present disclosure, no unlocking confirmation is necessary for the RAID data storage engine 304 in the RAID primary data storage device 206*a* in order to proceed with the method 400 subsequent to sending the multi-cast unlocking request 740.

Figure 7M:
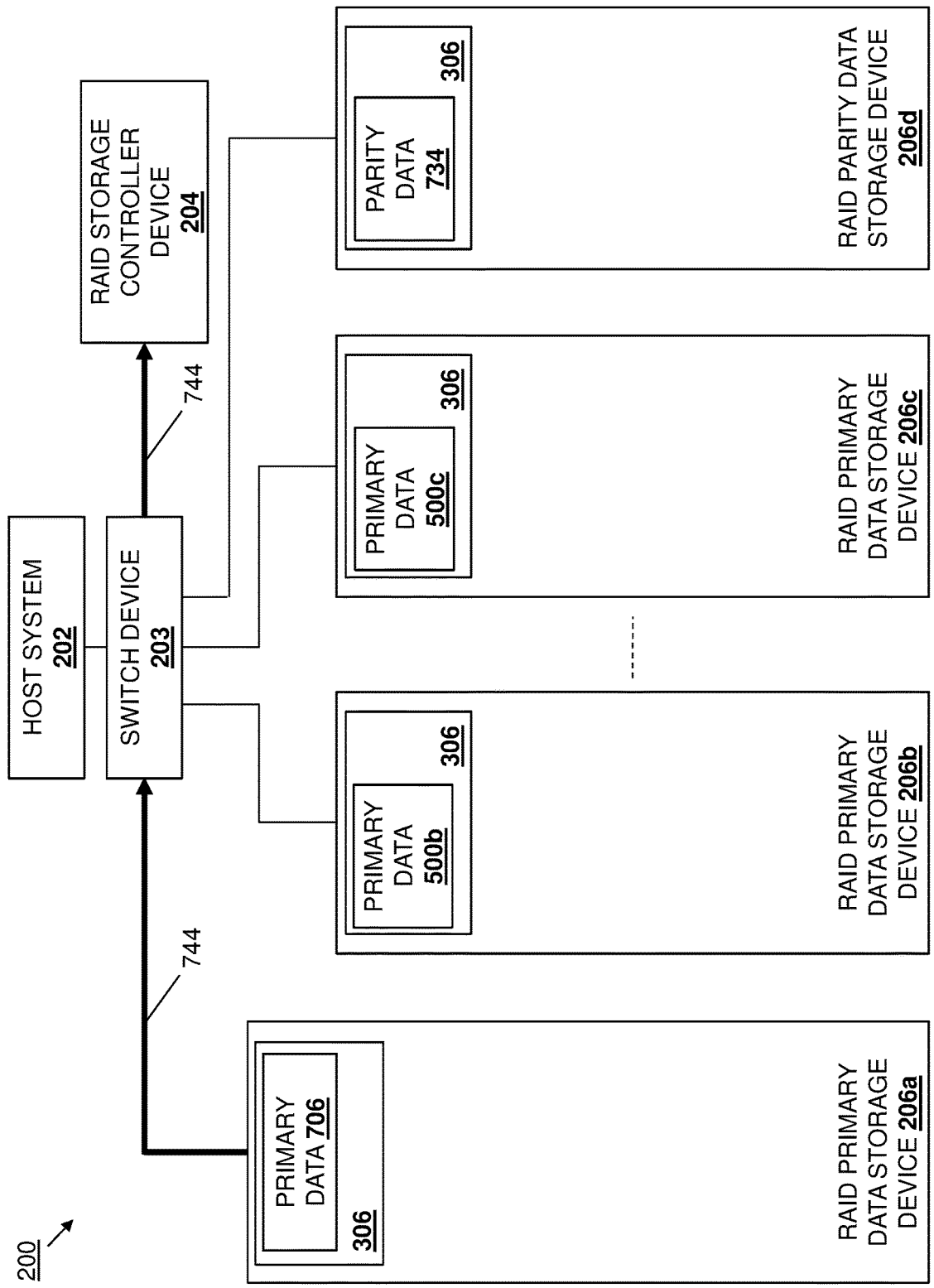
FIG. 7M is a schematic view illustrating an embodiment of the RAID data storage system of FIG. 2 operating during the method of FIG. 4.
Figure 7N:
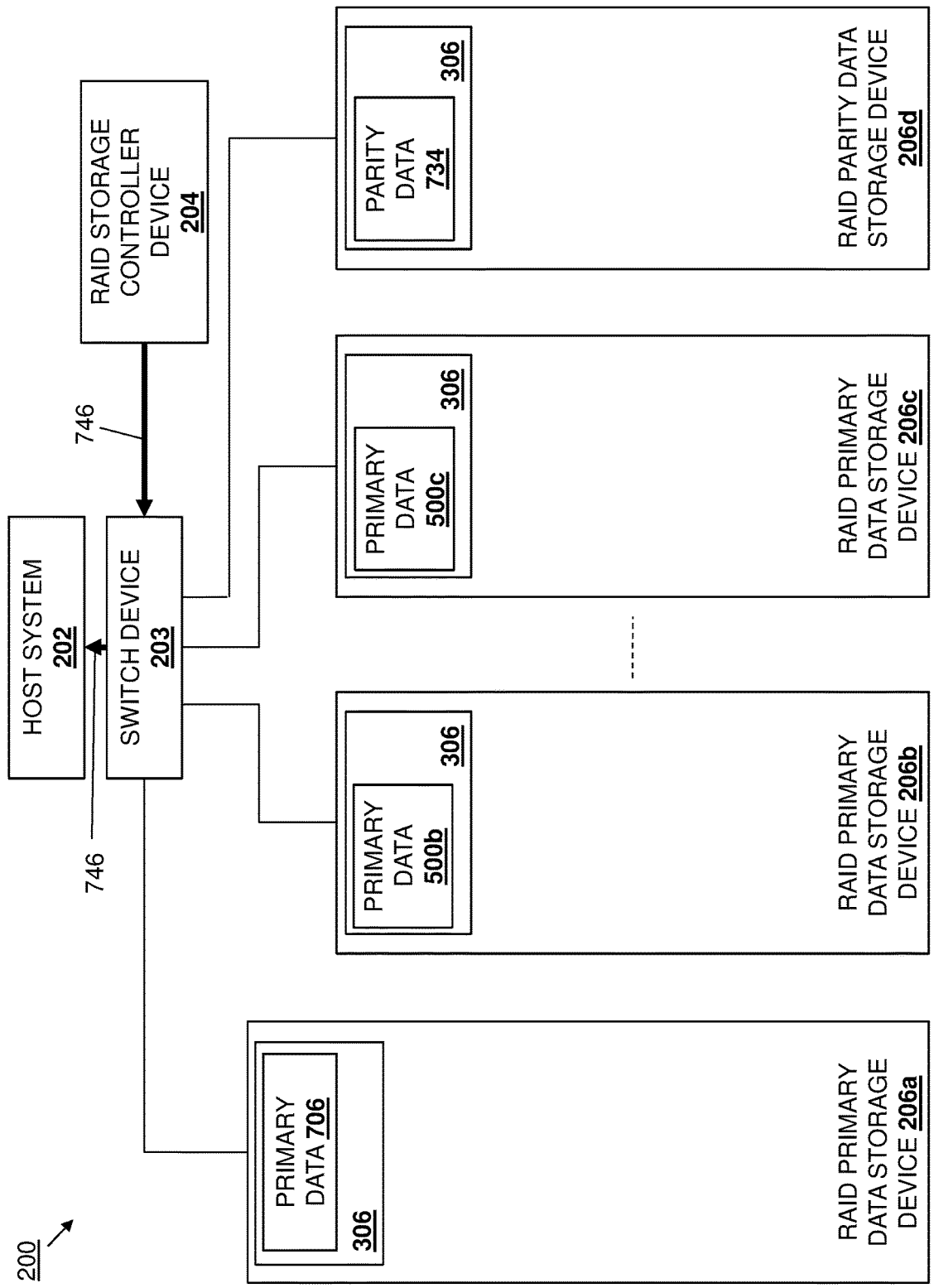
FIG. 7N is a schematic view illustrating an embodiment of the RAID data storage system of FIG. 2 operating during the method of FIG. 4.

The method 400 proceeds to block 418 where the first RAID data storage device transmits a completion communication to the RAID storage controller device. As illustrated in FIG. 7M, following the completion of the data update operations, the RAID data storage engine 304 in the RAID primary data storage device 206*a* may generate and transmit a completion communication 744 via its communication system 310 and the switch device 203 to the RAID storage controller device 204 that indicates that the multi-step command 702 has been completed, and may remove the journal entries/journal 708 associated with the multi-step command 702. As will be appreciated by one of skill in the art in possession of the present disclosure, in some embodiments the completion communication 744 may be transmitted in parallel with the multi-cast unlocking request 740 discussed above. Furthermore, as illustrated in FIG. 7N, in response to receiving the completion communication from the RAID primary data storage device 206*a*, the RAID storage controller engine in the RAID storage controller device 204 may generate and transmit a completion communication 746 via the switch device 203 to the host system 202 that indicates that the write command 700 has been completed, and may remove the journal entries/journal in the RAID storage controller device 204 that are associated with the write command 700.

While only an example of a "process write" operation has been described, one of skill in the art in possession of the present disclosure will recognize how the autonomous locking operations described above may be utilized in other operations while remaining within the scope of the present disclosure as well. For example, the autonomous locking operations discussed above may be utilized in the "degraded read" operations, "degraded write" operations, and/or other operations described in U.S. patent application Ser. No. 16/839,428, filed on Apr. 3, 2020, as well as any other data transfer operations (e.g., mirrored RAID volume operations performed in RAID 1 and RAID 10 configurations) that would be apparent to one of skill in the art in possession of the present disclosure.

Thus, systems and methods have been described that provide for autonomous locking operations by RAID data storage devices in a RAID data storage system in order to allow a stripe of data stored on those RAID data storage devices to be updated. For example, first RAID data storage devices may store data that is included in a data stripe, and a second RAID data storage device coupled to the first RAID data storage device may receive a command to perform a data update operation on a subset of data that is included in the data stripe. In response, the first RAID data storage device may transmit a locking request to each first RAID data storage device and receive a locking confirmation that indicates that each first RAID data storage device is locked. In response, the second RAID data storage device may complete data update operation on the subset of data that is included in the data stripe, and then transmit an unlocking request to each first RAID data storage device to cause each first RAID data storage device to unlock. The first RAID data storage device may then transmit a completion communication that indicates that the data update operation has been performed. As such, orchestration RAID storage-device-assisted data updates by RAID storage controller devices is substantially reduced by allowing RAID data storage devices to autonomously lock in order to satisfy the requirements of a data update command. As will be appreciated by one of skill in the art in possession of the present disclosure, while the discussion above involves RAID 5 operations (e.g., a RAID 5 write operation in the example above), other types of RAID operations (e.g., RAID 6 operations such as a RAID 6 write operation) will benefit from the autonomous RAID data storage device locking techniques described herein, and thus will fall within the scope of the present disclosure as well.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An autonomous Redundant Array of Independent Disks (RAID) data storage device locking system, comprising:
   a plurality of first Redundant Array of Independent Disks (RAID) data storage devices that store data that is included in a data stripe; and
   a second RAID data storage device that is coupled to the plurality of first RAID data storage devices and that is configured to:
      receive a command to perform a data update operation on a subset of data that is included in the data stripe;
      transmit a locking request to each of the plurality of first RAID data storage devices;
      receive at least one locking confirmation that indicates that each of the plurality of first RAID data storage devices is locked such that no changes may be made to the data that is included in the data stripe and stored on the plurality of first RAID data storage devices;
      complete, in response to receiving the at least one locking confirmation, the data update operation on the subset of data that is included in the data stripe;
      transmit, in response to completing the data update operation, an unlocking request to each of the plurality of first RAID data storage devices to cause each of the plurality of first RAID data storage devices to unlock; and
      transmit a completion communication that indicates that the data update operation has been performed.

2. The system of claim 1, wherein the locking request is a first multicast communication, and wherein the unlocking request is a second multicast communication.

3. The system of claim 1, wherein the second RAID data storage device is configured to:

begin the data update operation on a first portion of the subset of data that is included in the data stripe prior to transmitting the locking request to each of the plurality of first RAID data storage devices; and complete the data update operation on a second portion of the subset of data that is included in the data stripe subsequent to receiving the locking confirmation.

4. The system of claim 3, wherein the data update operation on the first portion of the subset of data that is included in the data stripe includes:

retrieving updated primary data that provides an update to current primary data that is included in the data stripe and that is stored on the second RAID data storage device;

performing an XOR operation on the current primary data and the updated primary data to generate interim parity data; and updating the current primary data with the updated primary data.

5. The system of claim 4, wherein the data update operation on the second portion of the subset of data that is included in the data stripe includes causing a third RAID data storage device to:

retrieve the interim parity data; and perform an XOR operation on current parity data that is included in the data stripe and that is stored on the third RAID data storage device to generate updated parity data; and update the current parity data with the updated parity data.

6. The system of claim 1, wherein the second RAID data storage device is configured to:

transmit a peer-to-peer command directly to a third RAID data storage device to cause the third RAID data storage device to complete the data update operation on the subset of data that is included in the data stripe.

7. The system of claim 1, further comprising:

a switch device that is coupled to each of the plurality of first RAID data storage devices and the second RAID data storage device, wherein the switch device is configured to:

receive a respective locking acknowledgement from each of the plurality of first RAID data storage devices; and transmit, in response to receiving the respective locking acknowledgement from each of the plurality of first RAID data storage device, the at least one locking confirmation to the second RAID data storage device that is provided by a single locking confirmation.

8. An Information Handling System (IHS), comprising:

a processing system; and a memory system that is coupled to the processing system and that includes instructions that, when executed by the processing system, cause the processing system to provide a Redundant Array of Independent Disks (RAID) data storage engine that is configured to:

receive a command to perform a data update operation on a subset of data that is included in a data stripe;

transmit a locking request to each of a plurality of first RAID data storage device that store data that is included in the data stripe;

receive at least one locking confirmation that indicates that each of the plurality of first RAID data storage devices is locked such that no changes may be made to the data that is included in the data stripe and stored on the plurality of first RAID data storage devices;

complete, in response to receiving the at least one locking confirmation, the data update operation on the subset of data that is included in the data stripe;

transmit, in response to completing the data update operation, an unlocking request to each of the plurality of first RAID data storage devices to cause each of the plurality of first RAID data storage devices to unlock; and transmit a completion communication that indicates that the data update operation has been performed.

9. The IHS of claim 8, wherein the locking request is a first multicast communication, and wherein the unlocking request is a second multicast communication.

10. The IHS of claim 8, wherein the RAID data storage engine is configured to:

begin the data update operation on a first portion of the subset of data that is included in the data stripe prior to transmitting the locking request to each of the plurality of first RAID data storage devices; and complete the data update operation on a second portion of the subset of data that is included in the data stripe subsequent to receiving the locking confirmation.

11. The IHS of claim 10, wherein the data update operation on the first portion of the subset of data that is included in the data stripe includes:

retrieving updated primary data that provides an update to current primary data that is included in the data stripe and that is stored in a storage system that is coupled to the processing system;

performing an XOR operation on the current primary data and the updated primary data to generate interim parity data; and updating the current primary data with the updated primary data.

12. The IHS of claim 11, wherein the data update operation on the second portion of the subset of data that is included in the data stripe includes causing a second RAID data storage device to:

retrieve the interim parity data; and perform an XOR operation on current parity data that is included in the data stripe and that is stored on the second RAID data storage device to generate updated parity data; and update the current parity data with the updated parity data.

13. The IHS of claim 8, wherein the RAID data storage engine is configured to:

transmit a peer-to-peer command directly to a second RAID data storage device to cause the second RAID data storage device to complete the data update operation on the subset of data that is included in the data stripe.

14. A method for autonomously locking Redundant Array of Independent Disks (RAID) data storage devices, comprising:

receiving, by a first Redundant Array of Independent Disks (RAID) data storage device, a command to perform a data update operation on a subset of data that is included in a data stripe;

transmitting, by the first RAID data storage device, a locking request to each of a plurality of second RAID data storage devices that store data that is included in the data stripe;

receiving, by the first RAID data storage device, at least one locking confirmation that indicates that each of the plurality of second RAID data storage devices is locked such that no changes may be made to the data that is included in the data stripe and stored on the plurality of first RAID data storage devices;

completing, by the first RAID data storage device in response to receiving the at least one locking confirmation, the data update operation on the subset of data that is included in the data stripe;

transmitting, by the first RAID data storage device in response to completing the data update operation, an unlocking request to each of the plurality of second RAID data storage devices to cause each of the plurality of second RAID data storage devices to unlock; and transmitting, by the first RAID data storage device, a completion communication that indicates that the data update operation has been performed.

15. The method of claim 14, wherein the locking request is a first multicast communication, and wherein the unlocking request is a second multicast communication.

16. The method of claim 14, further comprising:
beginning, by the first RAID data storage device, the data update operation on a first portion of the subset of data that is included in the data stripe prior to transmitting the locking request to each of the plurality of second RAID data storage devices; and completing, by the first RAID data storage device, the data update operation on a second portion of the subset of data that is included in the data stripe subsequent to receiving the locking confirmation.

17. The method of claim 16, wherein the data update operation on the first portion of the subset of data that is included in the data stripe includes:
retrieving, by the first RAID data storage device, updated primary data that provides an update to current primary data that is included in the data stripe and that is stored in the first RAID data storage device;

performing, by the first RAID data storage device, an XOR operation on the current primary data and the updated primary data to generate interim parity data; and updating, by the first RAID data storage device, the current primary data with the updated primary data.

18. The method of claim 17, wherein the data update operation on the second portion of the subset of data that is included in the data stripe includes the first RAID data storage device causing a third RAID data storage device to:
retrieve the interim parity data; and
perform an XOR operation on current parity data that is included in the data stripe and that is stored on the second RAID data storage device to generate updated parity data; and
update the current parity data with the updated parity data.

19. The method of claim 14, further comprising:
transmitting, by the first RAID data storage device, a peer-to-peer command directly to a third RAID data storage device to cause the third RAID data storage device to complete the data update operation on the subset of data that is included in the data stripe.

20. The method of claim 14, further comprising:
receiving, by a switch device coupled to the first RAID data storage device and each of the plurality of second RAID data storage devices, a respective locking acknowledgement from each of the plurality of second RAID data storage devices; and transmitting, by the switch device in response to receiving the respective locking acknowledgement from each of the plurality of second RAID data storage device, the at least one locking confirmation to the first RAID data storage device that is provided by a single locking confirmation.

\* \* \* \* \*